US010509443B2

(12) United States Patent
Honma et al.

(10) Patent No.: US 10,509,443 B2
(45) Date of Patent: Dec. 17, 2019

(54) HOUSING

(71) Applicant: TORAY INDUSTRIES, INC., Tokyo (JP)

(72) Inventors: Masato Honma, Ehime (JP); Takashi Fujioka, Ehime (JP)

(73) Assignee: TORAY INDUSTRIES, INC., Tokyo (JP)

(*) Notice: Subject to any disclaimer, the term of this patent is extended or adjusted under 35 U.S.C. 154(b) by 0 days.

(21) Appl. No.: 15/760,478

(22) PCT Filed: Sep. 6, 2016

(86) PCT No.: PCT/JP2016/076121

§ 371 (c)(1),
(2) Date: Mar. 15, 2018

(87) PCT Pub. No.: WO2017/047441

PCT Pub. Date: Mar. 23, 2017

(65) Prior Publication Data

US 2018/0260002 A1 Sep. 13, 2018

(30) Foreign Application Priority Data

Sep. 18, 2015 (JP) ................................ 2015-185990

(51) Int. Cl.
*H05K 5/00* (2006.01)
*G06F 1/16* (2006.01)
(Continued)

(52) U.S. Cl.
CPC ............ *G06F 1/1656* (2013.01); *A45C 11/00* (2013.01); *A45C 13/36* (2013.01); *B32B 5/12* (2013.01);
(Continued)

(58) Field of Classification Search
USPC ........................................................ 361/752
See application file for complete search history.

(56) References Cited

U.S. PATENT DOCUMENTS 4,406,393 A * 9/1983 Ascani, Jr. ........... B21D 26/055 228/157
4,631,221 A * 12/1986 Disselbeck ............ B29C 51/00 428/166

(Continued)

FOREIGN PATENT DOCUMENTS

CN 1494149 A 5/2004
CN 102202881 A 9/2011

(Continued)

OTHER PUBLICATIONS

International Search Report, issued in PCT/JP2016/076121, PCT/ISA/210, dated Dec. 6, 2016.

(Continued)

*Primary Examiner* — Hung S. Bui
(74) *Attorney, Agent, or Firm* — Birch, Stewart, Kolasch & Birch, LLP

(57) ABSTRACT

A housing includes: a bottom cover; a top cover; and a reinforcing structure that is disposed in a space divided by the bottom cover and the top cover and has a flat portion, a rising wall member erected on a rim of the flat portion, and a joining portion extending from a rim of the rising wall member, or a curved portion, and a joining portion extending from a rim of the curved portion, the joining portion of the reinforcing structure being joined to the bottom cover or the top cover. The area of the joining portion is within a range of 10 cm2 or more and 100 cm2 or less, and the maximum value of the height of the reinforcing structure is within a range of 3 mm or more and 30 mm or less.

27 Claims, 13 Drawing Sheets

(51) Int. Cl.
*A45C 11/00* (2006.01)
*A45C 13/36* (2006.01)
*B32B 5/12* (2006.01)
*B32B 5/26* (2006.01)

(52) U.S. Cl.
CPC .......... *B32B 5/26* (2013.01); *A45C 2011/002* (2013.01); *A45C 2011/003* (2013.01); *B32B 2250/05* (2013.01); *B32B 2457/00* (2013.01); *G06F 1/1616* (2013.01); *G06F 1/1626* (2013.01); *G06F 2200/1633* (2013.01)

(56) References Cited

U.S. PATENT DOCUMENTS 5,024,369 A * 6/1991 Froes .................... B23K 20/18 228/157
6,826,053 B2 * 11/2004 Kato .................... H01L 23/544 174/359
9,283,895 B2 3/2016 Sumi et al.
9,713,274 B2 7/2017 Takayuki et al.
2003/0189814 A1 10/2003 Kato et al.
2011/0250384 A1 10/2011 Sumi et al.
2014/0168924 A1 6/2014 Kuo et al.
2015/0077958 A1 3/2015 Takayuki et al.
2015/0183183 A1 7/2015 Takano et al.
2017/0280574 A1 9/2017 Takayuki et al.
2018/0260003 A1 * 9/2018 Honma .................... H05K 7/20

FOREIGN PATENT DOCUMENTS

CN 103871764 A 6/2014
CN 104470272 A 3/2015
JP 58-27997 U 2/1983
JP 8-288681 A 11/1996
JP 10-150280 A 6/1998
JP 2000-194269 A 7/2000
JP 2006-317942 A 11/2005
JP 2011-22848 A 2/2011
JP 2013-74043 A 4/2013
JP 2015-13484 A 1/2015

OTHER PUBLICATIONS

Written Opinion of the International Searching Authority, issued in PCT/JP2016/076121, PCT/ISA/237, dated Dec. 6, 2016.
Extended European Search Report dated Apr. 15, 2019, in European Patent Application No. 16846312.3.
Chinese Office Action and Search Report for Chinese Application No. 201680053861.3, dated Jul. 30, 2019, with an English translation of the Office Action.

* cited by examiner (a)

(b)

(a)
(b)
2
3
4
C
S3

(a)
4
3
2
S1
(b)
4
3
S2
2
(c)
4
3
S3
2

HOUSING

TECHNICAL FIELD

The present invention relates to a housing such as a housing in which an electronic device part is built (electronic device housing), and a housing such as an attache case or a carry case.

BACKGROUND ART

In recent years, for reducing the thickness and weight of an electronic device, improving the portability of the electronic device, and preventing breakage of components in the electronic device, a housing has been required to have increased rigidity. Specifically, when the electronic device is held with one hand and operated with the other hand, when the electronic device is transported, or when a monitor or the like is opened or closed, a biased load is applied, and therefore a force acts on the housing in a torsion direction. In addition, if the electronic device is dropped by accident during transportation, a force also acts in a torsion direction. Therefore, the housing is required to have high torsional rigidity. In view of such a background, many techniques for increasing the rigidity of a housing have been heretofore proposed.

Specifically, Patent Document 1 discloses an invention for increasing the rigidity of an electric device cabinet structure which includes a resin lower case having upper and lower electric device mounting surfaces, and an upper case having a front wall overlapping the upper electric device mounting surface. Patent Document 2 discloses an invention for increasing the rigidity of an electronic device housing of by making the electronic device housing have a structure in which surfaces of two plates are selectively bonded and joined together. Patent Document 3 discloses an invention for increasing the rigidity of an electronic device housing by abutting the tip of a rib, which is formed on the inner surface of a first housing, against the inner surface of a second housing.

PRIOR ART DOCUMENT

Patent Documents

Patent Document 1: Japanese Patent Laid-open Publication No. 10-150280

Patent Document 2: Japanese Patent Laid-open Publication No. 8-288681

Patent Document 3: Japanese Patent Laid-open Publication No. 2011-22848

SUMMARY OF THE INVENTION

Problems to be Solved by the Invention

However, in the invention disclosed in Patent Document 1, the upper electric device mounting surface of the resin lower case and the front wall of the upper case are pressure-welded to be joined. Therefore, according to the invention disclosed in Patent Document 1, it is not possible to provide a housing which has a level of torsional rigidity required in the market, and is excellent in portability.

In addition, in the invention disclosed in Patent Document 2, the inner plate is joined to the whole surface of the outer plate, and stretch-molding is performed to form a heat pipe channel, so that the cooling capacity is improved. However, in the heat pipe channel formed by stretch-molding, the thickness of the plate decreases, and therefore torsional rigidity required for the housing cannot be attained. In addition, the inner plate is formed on the whole surface of the outer plate, and thus from the viewpoint of weight reduction, it is hard to say that the invention in Patent Document 2 provides an effective method for improving rigidity.

In addition, in the invention disclosed in Patent Document 3, the tip of the rib is in contact with only the inner surface of the housing. Thus, in the invention disclosed in Patent Document 3, if torsion occurs due to application of a heavy load to the housing, the tip of the rib relatively slips with respect to the inner surface of the housing, and therefore only a certain level of torsional deformation can be suppressed.

As described above, in conventional techniques for increasing the rigidity of the housing, it is not possible to impart high torsional rigidity to the housing while attaining thickness reduction and weight reduction. Thus, it is expected to provide a technique capable of imparting high torsional rigidity to the housing while attaining thickness reduction and weight reduction.

The present invention has been made in view of the above-described problems, and an object of the present invention is to provide a housing, particularly an electronic device housing in which an electronic device component is built, the housing having improved torsional rigidity while having a reduced thickness and weight.

Solutions to the Problems

A housing according to a first aspect of the present invention includes: a bottom cover; a top cover; and a reinforcing structure that is disposed in a space divided by the bottom cover and the top cover and has a flat portion, a rising wall member erected on a rim of the flat portion, and a joining portion extending from a rim of the rising wall member, or a curved portion, and a joining portion extending from a rim of the curved portion. The joining portion of the reinforcing structure is joined to the bottom cover or the top cover, the area of the joining portion is within a range of 10 $cm^2$ or more and 100 $cm^2$ or less, and the maximum value of the height of the reinforcing structure is within a range of 3 mm or more and 30 mm or less.

In the housing according to the first aspect of the present invention, the projected area of the reinforcing structure in a direction of the bottom cover or the top cover to which the joining portion is joined is within a range of 60% or more and 95% or less of the area of the bottom cover or the top cover to which the joining portion is joined, in the above-described invention.

In the housing according to the first aspect of the present invention, the volume of a hollow structure formed by joining the joining portion to the bottom cover or the top cover is within a range of 55% or more and 95% or less of the volume of the space, in the above-described invention.

A housing according to a second aspect of the present invention includes: a bottom cover; a top cover; and a reinforcing structure that is disposed in a space divided by the bottom cover and the top cover and has an opening. The rim of the reinforcing structure is joined to the bottom cover or the top cover, and the projected area of the reinforcing structure in a direction of the bottom cover or the top cover to which the rim of the reinforcing structure is joined is within a range of 60% or more and 95% or less of the area of the bottom cover or the top cover to which the rim of the reinforcing structure is joined.

In the housing according to the second aspect of the present invention, the volume of a hollow structure formed by joining the rim to the bottom cover or the top cover is within a range of 55% or more and 95% or less of the volume of the space, in the above-described invention.

A housing according to a third aspect of the present invention includes: a bottom cover; a top cover; and a reinforcing structure that is disposed in a space divided by the bottom cover and the top cover and has an opening. The rim of the reinforcing structure is joined to the bottom cover or the top cover, and the volume of a hollow structure formed by joining the rim of the reinforcing structure to the bottom cover or the top cover is within a range of 55% or more and 95% or less of the volume of the space.

In the housing according to the present invention, the reinforcing structure is bonded to the bottom cover or the top cover by thermal welding, in the above-described invention.

In the housing according to the present invention, the reinforcing structure is joined to the bottom cover or the top cover in such a manner that the peeling load at 23° C. is within a range of 60 $N/cm^2$ or more and 5000 $N/cm^2$ or less, and the peeling load at 200° C. is within a range of less than 60 $N/cm^2$, in the above-described invention.

In the housing according to the present invention, the reinforcing structure, and the bottom cover or the top cover to which the reinforcing structure is joined are formed of a fiber-reinforced composite material, a thermoplastic resin is provided in or on a joining portion of at least one of the reinforcing structure and the top cover or the bottom cover to which the reinforcing structure is joined, and the reinforcing structure and the bottom cover or the top cover are joined with the thermoplastic resin, in the above-described invention.

In the housing according to the present invention, the reinforcing structure and the bottom cover or the top cover are directly joined, in the above-described invention.

The housing according to the present invention includes a heat generation member disposed on a surface of the reinforcing structure in the hollow structure formed by joining the reinforcing structure and the bottom cover or the top cover, in the above-described invention.

The housing according to the present invention includes another reinforcing structure in the hollow structure formed by joining the reinforcing structure and the bottom cover or the top cover, in the above-described invention.

In the housing according to the present invention, the other reinforcing structure is joined to the inner surface of the reinforcing structure, and the bottom cover or the top cover to which the reinforcing structure is joined, in the above-described invention.

Effects of the Invention

In the housing according to the present invention, torsional rigidity can be improved while thickness reduction and weight reduction are attained.

EMBODIMENTS OF THE INVENTION

The present inventors have extensively conducted studies, and resultantly found that by joining a reinforcing structure to a housing, the torsional rigidity of the housing can be considerably improved as compared to a case where the reinforcing structure is not joined to the housing. Hereinafter, housings according to first to third embodiments of the present invention, which are conceived from the above-described findings, will be described in detail with reference to the drawings. Examples of the application of the housing of the present invention may include attache cases, carry cases and electronic device housings in which an electronic device component is built, and more specific examples thereof include speakers, displays, HDDs, notebook personal computers, mobile phones, digital still cameras, PDAs, plasma displays, televisions, lighting systems, refrigerator and game machines. In particular, the housing is preferably used for clamshell-type personal computers and tablet-type personal computers which have high torsional rigidity and are required to be light and thin.

First Embodiment

First, a housing according to a first embodiment of the present invention will be described with reference to FIGS. 1 to 7.

Figure 1:
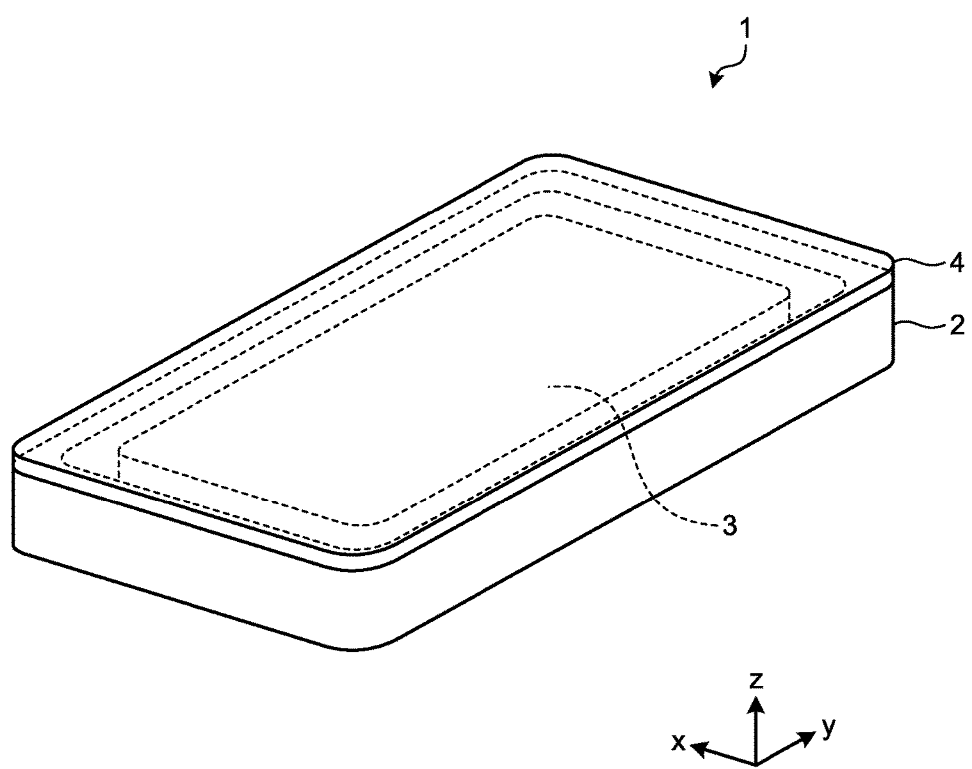
FIG. 1 is a perspective view showing a configuration of a housing according to a first embodiment of the present invention.

FIG. 1 is a perspective view showing a configuration of the housing according to the first embodiment of the present invention. As shown in FIG. 1, a housing 1 according to the first embodiment of the present invention includes, as main components, a bottom cover 2 rectangular in plan view, a reinforcing structure 3 joined to the bottom cover 2, and a top cover 4 rectangular in plan view. The bottom cover and top cover and the reinforcing structure in the present invention are functionally separated, and shaped in accordance with a purpose. In the following description, a direction parallel to short sides of the bottom cover 2 and the top cover 4 is defined as an x direction, a direction parallel to long sides of the bottom cover 2 and the top cover 4 is defined as a y direction, and a direction perpendicular to the x direction and the y direction is defined as a z direction (vertical direction).

Figure 2:
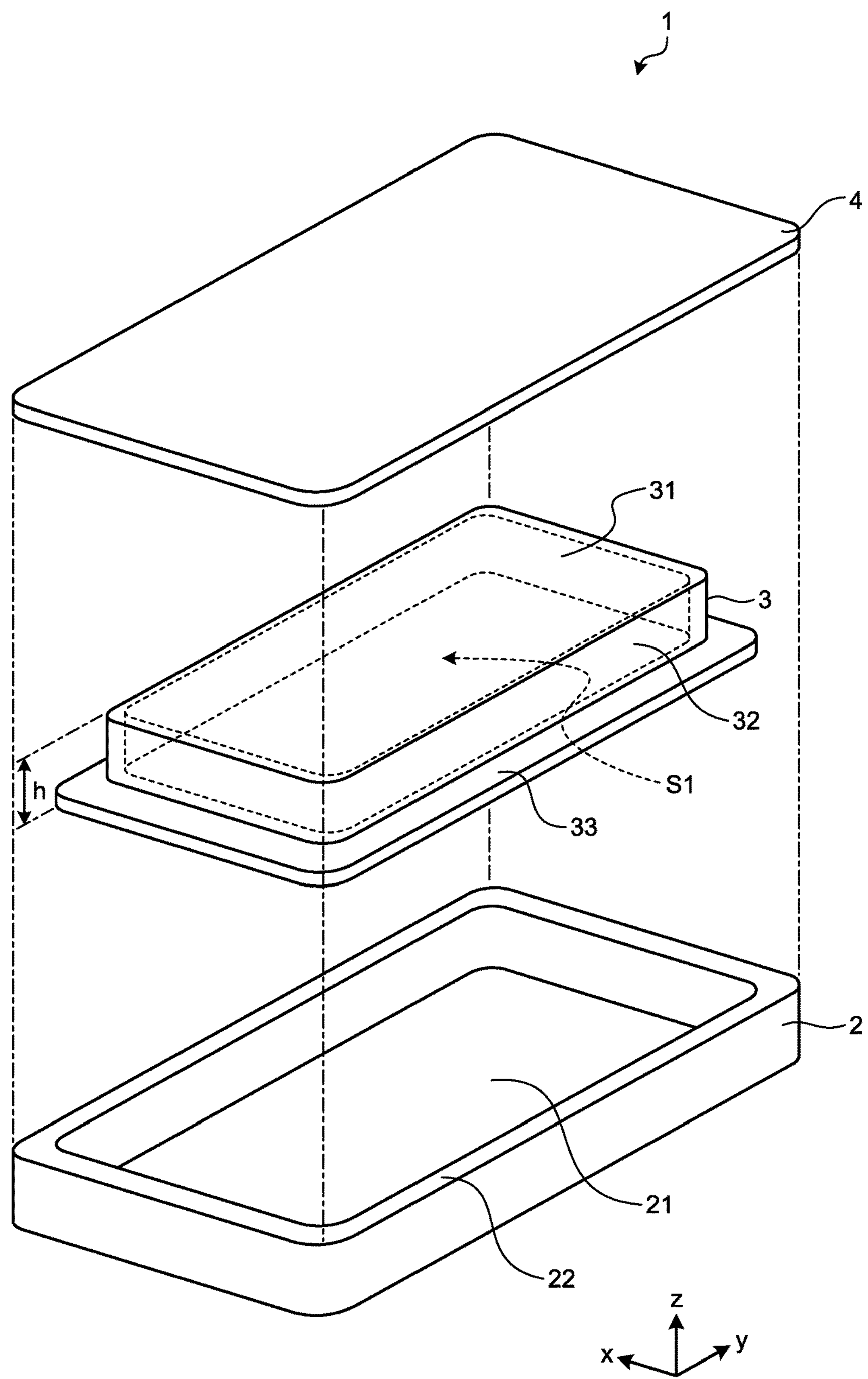
FIG. 2 is an exploded perspective view of the housing shown in FIG. 1.

FIG. 2 is an exploded perspective view of the housing 1 shown in FIG. 1. As shown in FIG. 2, the bottom cover 2 includes a flat portion 21 parallel to an x-y plane and rectangular in plan view, and a rising wall member 22 erected in the positive direction of z from a rim of the flat portion 21. The thickness of a member that forms the bottom cover 2 is preferably within a range of 0.1 mm or more and 0.8 mm or less. In addition, the elastic modulus of the member that forms the bottom cover 2 is preferably within a range of 20 GPa or more and 120 GPa or less.

In addition, it is preferable that the bottom cover 2 is formed of any one of a metal material and a fiber-reinforced composite material, and the bottom cover 2 may be formed by combining these materials. From the viewpoint of exhibiting high torsional rigidity, the bottom cover 2 is preferably a seamless member formed of the same material. From the viewpoint of productivity, the flat portion 21 having a simple shape may be formed using the metal material and the fiber-reinforced composite material which have high dynamic characteristics, and the rising wall member 22 and a joining portion which have a complicated shape may be formed by injection molding etc. using a resin material excellent in moldability.

It is preferable to use a light metal material such as an aluminum alloy, a magnesium alloy or a titanium alloy as the metal material. Examples of the aluminum alloy may include A2017 and A2024 as Al—Cu systems, A3003 and A3004 as Al—Mn systems, A4032 as an Al—Si system, A5005, A5052 and A5083 as Al—Mg systems, A6061 and A6063 as Al—Mg—Si systems, and A7075 as an Al—Zn system. Examples of magnesium alloy may include AZ31, AZ61, and AZ91 as Mg—Al—Zn systems. Examples of the titanium alloy may include alloys containing palladium of grades 11 to 23, alloys containing cobalt and palladium, and Ti-6Al-4V corresponding to grade 50 ($\alpha$ alloy), grade 60 ($\alpha$-$\beta$ alloy) and grade 80 ($\beta$ alloy).

As reinforcing fibers to be used in the fiber-reinforced composite material, fibers such as carbon fibers, glass fibers, aramid fibers, boron fibers, PBO fibers, high strength polyethylene fibers, alumina fibers and silicon carbide fibers can be used, and two or more of these fibers may be mixed, and used. These reinforcing fibers can be used as fiber structures such as long fibers aligned in one direction, single tows, woven fabrics, knits, nonwoven fabrics, mats and braided cords.

Examples of the matrix resin that can be used include thermosetting resins such as epoxy resins, phenol resins, benzoxazine resins and unsaturated polyester resins, polyester-based resins such as polyethylene terephthalate (PET), polybutylene terephthalate (PBT), polytrimethylene terephthalate (PTT), polyethylene naphthalate and liquid crystal polyester, polyolefins such as polyethylene (PE), polypropylene (PP) and polybutylene, styrene-based resins, urethane resins, and thermosetting resins such as polyoxymethylene (POM), polyamide (PA), polycarbonate (PC), polymethyl methacrylate (PMMA), polyvinyl chloride (PVC), polyphenylene sulfide (PPS), polyphenylene ether (PPE), modified PPE, polyimide (PI), polyamideimide (PAI), polyether imide (PEI), polysulfone (PSU), modified PSU, polyether sulfone (PES), polyketone (PK), polyether ketone (PEK), polyether ketone ketone (PEKK), polyarylate (PAR), polyether nitrile (PEN), phenol-based resins, and phenoxy resins. From the viewpoint of productivity and dynamic characteristics, thermosetting resins are preferably used, and among them, epoxy resins are preferably used. From the viewpoint of moldability, thermoplastic resins are preferably used. Among them, polyamide resins are preferably used from the viewpoint of strength, polycarbonate resins are preferably used from the viewpoint of impact resistance, polypropylene resins are preferably used from the viewpoint of lightness, and polyphenylene sulfide resins are preferably used from the viewpoint of heat resistance. The resin may be used not only as a matrix resin of the fiber-reinforced composite material but also as the bottom cover, the top cover or the reinforcing structure which is composed of a resin itself.

In the present invention, it is preferable that a prepreg including the reinforcing fiber and matrix resin is used as a material of each member from the viewpoint of handling characteristics in lamination etc. From the viewpoints of high dynamic characteristics and design freedom, it is preferable to use unidirectional continuous fiber prepreg, and from the viewpoint of isotropic dynamic characteristics and moldability, it is preferable to use a fabric prepreg. In addition, the member may be composed of a laminate of these prepregs.

The reinforcing structure 3 includes a flat portion 31 parallel to an x-y plane and rectangular in plan view, a rising wall member 32 erected in the negative direction of z from a rim of the flat portion 31, and a joining portion 33 extending in an outward direction parallel to an x-y plane from the rim of the rising wall member 32. The reinforcing structure 3 is joined to the bottom cover 2 with a hollow structure S1 formed between the flat portion 31 and the flat portion 21 of the bottom cover 2 by joining the joining portion 33 to the flat portion 21 of the bottom cover 2. Use of the reinforcing structure 3 having the joining portion 33 is one factor of further improving torsional rigidity in the present invention, and it is preferable that the joining portion 33, the bottom cover 2 or the top cover 4 are joined together. In addition, it is preferable that an electronic component is packed in the hollow structure S1, and it is preferable that an electronic component is disposed on the reinforcing structure 3 because the distance from the bottom cover 2 or top cover 4 joined to the reinforcing structure 3 can be increased.

The area of the joining portion 33 in a plane parallel to the x-y plane is within a range of 10 $cm^2$ or more and 100 $cm^2$ or less. Specifically, when the area of the joining portion 33 is less than 10 $cm^2$, there arises the problem if a load that causes large deformation is applied to the housing 1, the reinforcing structure 3 is peeled from the bottom cover 2, and thus original torsional rigidity cannot be exhibited. When the area of the joining portion 33 is larger than 100 $cm^2$, there arises the problem that the increase in area of the joining portion 33 causes an increase in weight of the housing 1 and a decrease in volume of the hollow structure S1. Thus, the area of the joining portion 33 is within a range of 10 $cm^2$ or more and 100 $cm^2$ or less.

The maximum value of a distance h between the flat portion 31 of the reinforcing structure 3 and the flat portion 21 of the bottom cover 2 (height of the reinforcing structure 3 from the flat portion 21) is within a range of 3 mm or more and 30 mm or less. In the present invention, the height h of the reinforcing structure 3 is one factor of exhibiting torsional rigidity. Thus, when the maximum value of the height h is less than 3 mm, there arises the problem that the effect of the rising wall member 32 is low in the housing 1, so that original torsional rigidity cannot be exhibited. On the other hand, when the maximum value of the height h is larger than 30 mm, there arises the problem that it is necessary to increase the thickness of the rising wall member 32, resulting in an increase in weight of the housing 1. Thus, the maximum value of the height h is within a range of 3 mm or more and 30 mm or less.

Figure 3:
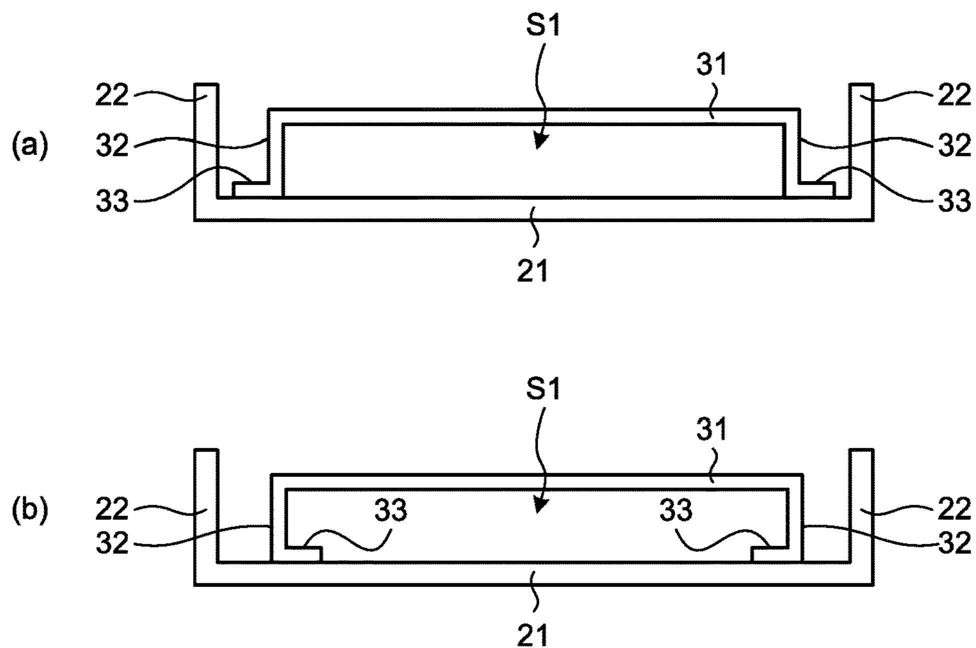
FIGS. 3(*a*) and 3(*b*) are sectional views showing one example of a configuration of a reinforcing structure shown in FIG. 2.
Figure 4:
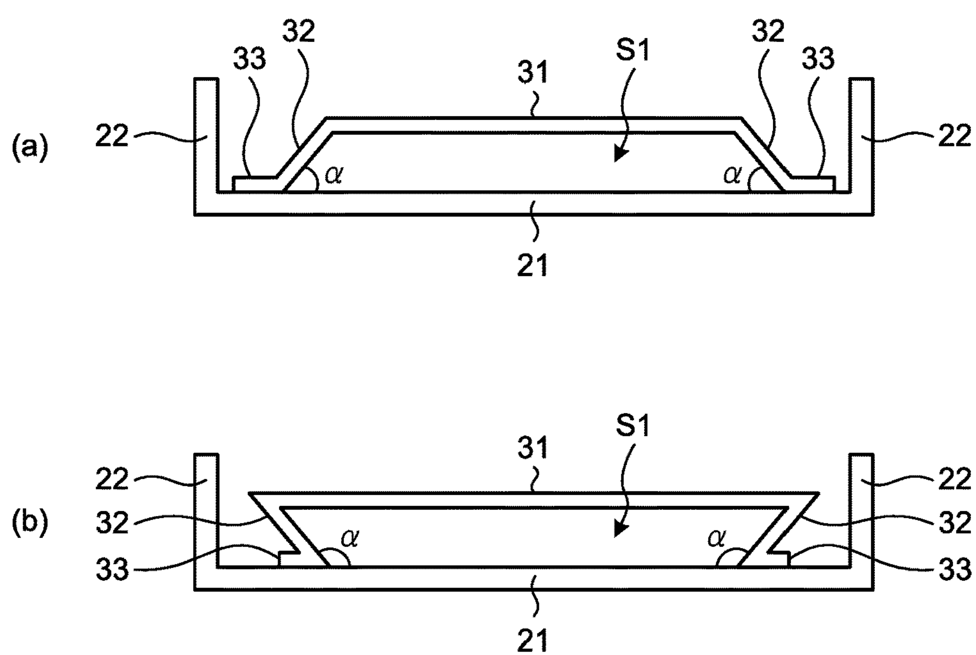
FIGS. 4(*a*) and 4(*b*) are sectional views showing one example of a configuration of the reinforcing structure shown in FIG. 2.

FIGS. 3 and 4 are sectional views showing one example of a configuration of the reinforcing structure 3 shown in FIG. 2. In the present embodiment, the joining portion 33 is provided so as to extend in an outward direction parallel to the x-y plane from the rim of the rising wall member 32 as shown in FIG. 3(*a*), but the joining portion 33 may be provided so as to extend in an inward direction parallel to the x-y plane from the rim of the rising wall member 32 as shown in FIG. 3(*b*). In addition, it is preferable that the angle α of the rising wall member 32 with respect to the flat portion 21 of the bottom cover 2 (or the joining portion 33 of the reinforcing structure 3) is within a range of 45° or more and 135° or less as shown in FIGS. 4(*a*) and 4(*b*). FIG. 4(*a*) shows a state in which the angle α of the rising wall member 32 is an acute angle, and FIG. 4(*b*) shows a state in which the angle α of the rising wall member 32 is an obtuse angle.

Figure 5:
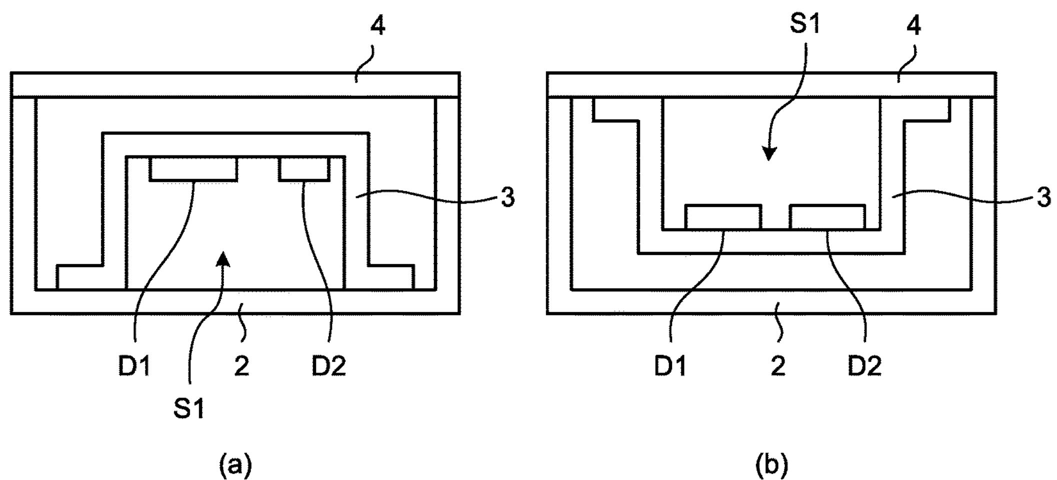
FIGS. 5(*a*) and 5(*b*) are sectional views showing one example of a configuration of a housing.

FIG. 5 is a sectional view showing one example of a configuration of the housing. As shown in FIGS. 5(*a*) and 5(*b*), heat generation members D1 and D2 are disposed in the hollow structure S1 formed by joining the reinforcing structure 3 and the bottom cover 2 or the top cover 4. It is preferable that the heat generation members D1 and D2 are disposed on a surface of the reinforcing structure 3 on the hollow structure S1 side. With this configuration, the distance between the bottom cover 2 touched by a user of an electronic device and the heat generation members D1 and D2 can be increased to suppress elevation of the temperature of the bottom cover 2. In this specification, the "heat generation member" means a component that generates heat as an electronic device is operated, and particularly refers to a component that causes temperature elevation by 10° C. or more as the electronic device is operated. Examples of the heat generation member may include LEDs, capacitors, inverters, reactor elements, thermistor elements, power transistor elements, motors, CPUs, and electronic boards on which these elements are mounted.

In the present invention, it is preferable that another reinforcing structure is provided in the hollow structure S1 formed between the reinforcing structure 3 and the bottom cover 2 or the top cover 4 to which the reinforcing structure 3 is joined. Another reinforcing structure provided in the hollow structure S1 may be joined to only the bottom cover 2 or the top cover 4, or may be joined to only the reinforcing structure 3. Preferably, another reinforcing structure is joined to the inner surface of the reinforcing structure 3, and also joined to the bottom cover 2 or the top cover 4 to which the reinforcing structure 3 is joined. Here, the inner surface of the reinforcing structure 3 means a surface inside the hollow structure S1 in the reinforcing structure 3.

Figure 6:
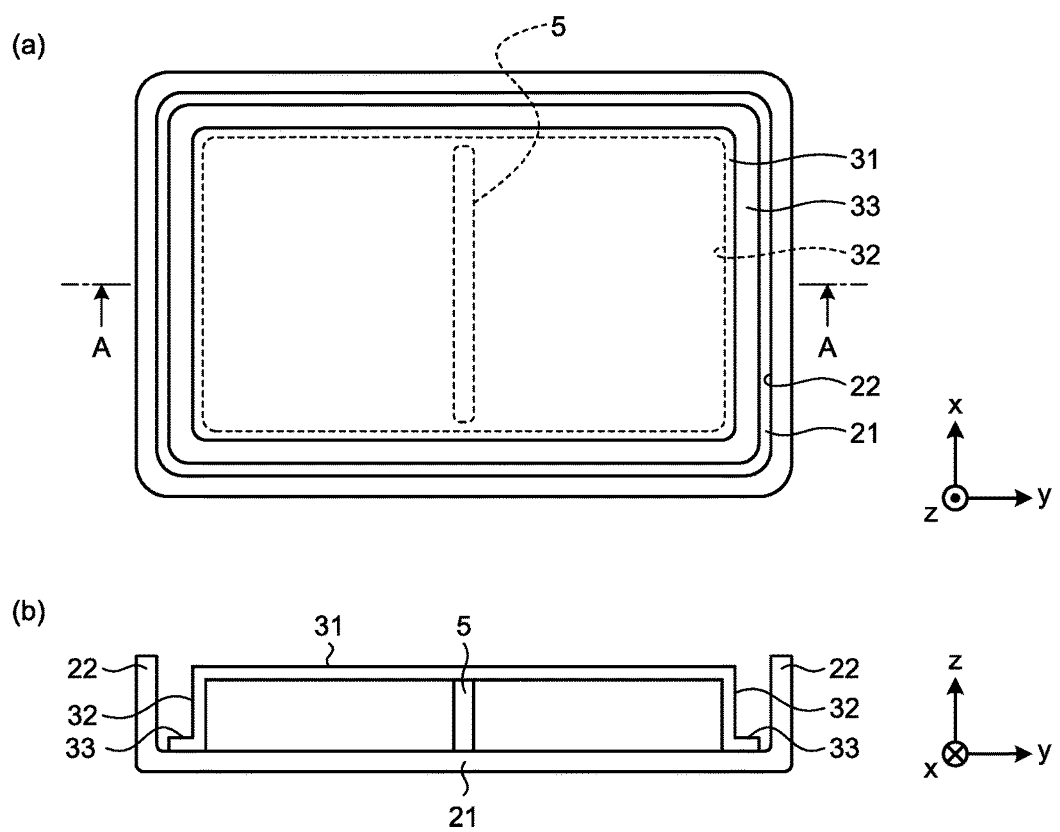
FIGS. 6(*a*) and 6(*b*) show a plan view and a sectional view showing a configuration of another reinforcing structure.

Torsional rigidity may also be increased by disposing another in the hollow structure S1 formed between the flat portion 31 of the reinforcing structure 3 and the flat portion 21 of the bottom cover 2 in such a manner that the inner surface of the reinforcing structure 3 is joined to the bottom cover 2 or the top cover 4 to which the reinforcing structure 3 is joined. FIG. 6(*a*) is a plan view showing a configuration of another reinforcing structure, and FIG. 6(*b*) is a sectional view taken along line A-A in FIG. 6(*a*). As shown in FIGS. 6(*a*) and 6(*b*), another reinforcing structure 5 is a member disposed so as to extend in the x direction at the central part of the hollow structure S1 in the y direction, and is connected to the flat portion 21 of the bottom cover 2 and the flat portion 31 of the reinforcing structure 3. By integrating the flat portion 21 of the bottom cover 2 and the flat portion 31 of the reinforcing structure 3 with the other reinforcing structure 5 interposed therebetween, the bottom cover 2 and the reinforcing structure 3 are deformed in synchronization with each other if a load is applied, and therefore the deflection rigidity of the housing 1 can be improved. In addition, the rising wall member 22 of the bottom cover 2 and the rising wall member 32 of the reinforcing structure 3 are integrated with the other reinforcing structure 5, and thus the rising wall members of the bottom cover 2 and the reinforcing structure 3 are hardly deformed particularly inside direction of the housing 1, so that the torsional rigidity of the housing 1 can be improved.

As long as the other reinforcing structure 5 is connected to the flat portion 21 of the bottom cover 2 and the flat portion 31 of the reinforcing structure 3, the other reinforcing structure 5 may be a member disposed so as to extend in the y direction at the central part of the hollow structure S1 in the x direction, or a member disposed so as to extend in the diagonal direction of the hollow structure S1. In particular, it is preferable that the other reinforcing structure 5 is disposed so as to pass through a position at which the amount of deflection of the flat portion 21 of the bottom cover 2 increases when a load is applied in the thickness direction, and a plurality of members may be disposed with the members crossing one another. In addition, it is preferable that the other reinforcing structure 5 is formed of an impact absorbing material excellent in elasticity, such as a resin material having an elastomer or rubber component, or a gel, and accordingly, not only deflection rigidity but also an effect against impact can be exhibited.

Figure 7:
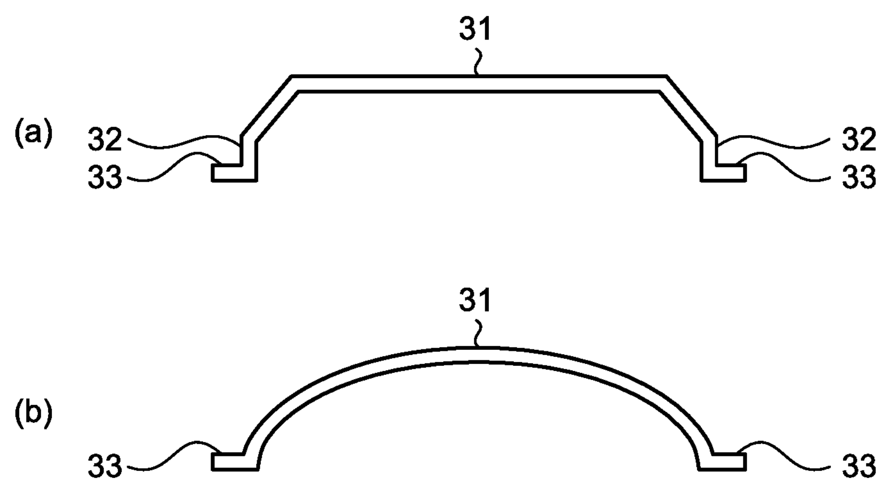
FIGS. 7(*a*) and 7(*b*) are sectional views showing a configuration of the reinforcing structure in the housing according to the first embodiment of the present invention.

In the present embodiment, the reinforcing structure 3 includes the flat portion 31, the rising wall member 32 and the joining portion 33 as shown in FIG. 7(*a*), but the reinforcing structure 3 may be formed by using a curved member as the flat portion 31 and forming the joining portion 33 on a rim of the curved member as shown in FIG. 7(*b*). That is, a curved member may be used as the flat portion 31, resulting in omission of the rising wall member 32. In addition, from the viewpoint of increasing rigidity and effectively utilizing the space, an irregular shape may be formed on the flat portion 31. In the present embodiment, the reinforcing structure 3 is joined to the bottom cover 2, but the reinforcing structure 3 may be joined to the top cover 4 to form the hollow structure S1 between the flat portion 31 of the reinforcing structure 3 and the top cover 4.

In the present embodiment, the joining portion 33 is formed on all of the four rising wall members 32 formed on respective sides of the flat portion 31, but the joining portion 33 may be formed on at least one of the four rising wall members 32. Alternatively, the joining portion 33 may be formed on two or more adjacent rising wall members 32 among the four rising wall members 32. In addition, the area of the joining portion 33 formed on one rising wall member 32 is preferably 1 $cm^2$ or more. In addition, the thickness of the member that forms the reinforcing structure 3 is preferably within a range of 0.3 mm or more and 1.0 mm or less from the viewpoint of reducing the weight and thickness of the housing. In addition, the elastic modulus of the member that forms the reinforcing structure 3 is preferably within a range of 20 GPa or more and 120 GPa or less.

In addition, it is preferable that the reinforcing structure 3 is formed of any one of the above-described metal material and fiber-reinforced composite material, and the material can be selected according to the purpose of the reinforcing structure 3. That is, from the viewpoint of exhibiting a high reinforcing effect, it is preferable to use a metal material or fiber reinforced composite material having a high elastic modulus, and from the viewpoint of heat dissipation, it is preferable to use a metal material having a high thermal conductivity. Further, when the reinforcing structure 3 is formed of a fiber reinforced composite material, it is preferable that the reinforcing structure 3 is composed of a laminate of continuous fiber prepregs. In addition, the ratio of the linear expansion coefficient of the reinforcing structure 3 to the linear expansion coefficient of the bottom cover 2 or the top cover 4 to which the reinforcing structure 3 is joined is preferably within a range of 0.1 or more and 10 or less.

In addition, it is preferable that the joining portion 33 of the reinforcing structure 3 is bonded to the flat portion 21 of the bottom cover 2 by thermal welding. The peeling load at 23° C. is more preferably within a range of 100 N/$cm^2$ or more and 5000 N/$cm^2$ or less. Examples of the thermal welding method may include an insert injection method, an outsert injection method, a vibration welding method, an ultrasonic welding method, a laser welding method and a hot plate welding method. Here, it is preferable that the bonding surface between the joining portion 33 and the flat portion 21 has a peeling load of less than 60 N/$cm^2$ at 200° C. The peeling load at 200° C. is more preferably 30 N/$cm^2$ or less.

In addition, this peeling load is preferably less than 60 N/$cm^2$ at 180° C., and it is preferable from the viewpoint of disassembling adhesive that the peeling load can be easily peeled off in a lower temperature range. However, when the disassembling temperature lowers, the reinforcing structure may be peeled off temperature elevation associated with operation of an electronic component or depending on the temperature of a use environment in use as a housing. Therefore, it is preferable that in the temperature range where the housing is used, the reinforcing structure is joined with high bonding strength, and in the disassembling temperature range, the reinforcing structure can be easily peeled off. Thus, the peeling load at 80° C. is more preferably within a range of 60 N/$cm^2$ or more and 5000 N/$cm^2$ or less.

The peeling load at 200° C. is preferably as low as possible, and most preferably 10 N/$cm^2$ or less. Since the peeling load at 200° C. is preferably as low as possible, the lower limit thereof is not particularly limited, and is preferably 0 N/$cm^2$ or more, but the peeling load at 200° C. is more preferably 1 N/$cm^2$ or more because when it is excessively low, handling characteristics may be deteriorated. With this configuration, disassembling bondability that makes it possible to easily remove the reinforcing structure 3 can be exhibited, so that repair and recycling of an electronic device can be facilitated. In addition, it is preferable that the reinforcing structure 3, and the bottom cover 2 or the top cover 4 to which the reinforcing structure 3 is joined are formed of a fiber-reinforced composite material, a thermoplastic resin is provided in or on a joining portion of at least one of the reinforcing structure 3 and the top cover 4 or the bottom cover 2 to which the reinforcing structure 3 is joined, and the reinforcing structure 3 and the bottom cover 2 or the top cover 4 are joined with the thermoplastic resin, in the above-described invention.

As a method for providing a thermoplastic resin on the joining portion, mention is made of a method in which using a fiber-reinforced sheet (prepreg sheet) including a thermoplastic resin as a matrix resin, molding is performed to obtain the reinforcing structure 3, and the bottom cover 2 or the top cover 4 to which the reinforcing structure 3 is joined. A molded product obtained by this method is preferable because a thermoplastic resin is present on a surface of the molded product at a high ratio, and therefore it is possible to secure a wide bonding area in joining, leading to an increase in selection freedom of a joining site. From the viewpoint of the dynamic characteristics of the members, a fiber-reinforced composite material including a thermosetting resin as a matrix resin is preferable, and as a method for providing a thermoplastic resin on such a member, a mention is made of a method in which a molten material obtained by heating and melting a thermoplastic resin or a solution obtained by dissolving a thermoplastic resin in a solvent is applied to provide a thermoplastic resin on the fiber-reinforced composite material. In addition, a mention may be made of, for example, a method in which in molding and curing of a fiber-reinforced sheet (prepreg sheet) including a thermosetting resin as a matrix resin, a laminate in which a film or nonwoven fabric composed of a thermoplastic resin is laminated on a surface is molded under heat and pressure on the outermost layer of the fiber-reinforced sheet (prepreg sheet).

In addition, it is preferable that the reinforcing structure 3 and the bottom cover 2 or the top cover 4 are joined directly. When a fiber reinforced composite material having a thermoplastic resin is used for the joining portion 33 of the reinforcing structure 3 and/or the joining portion of the bottom cover 2 or the top cover 4 that is bonded to the joining portion 33, it is not necessary to use an adhesive agent other than the members, and the members can be joined directly, so that an increase in weight of the housing 1 can be suppressed. A suitable method for directly joining the reinforcing structure 3 and the bottom cover 2 or the top cover 4 is a method using a laminate, in which a film or nonwoven fabric composed of a thermoplastic resin is laminated on a surface, for the outermost layer of a fiber-reinforced sheet (prepreg sheet) including a thermosetting resin as a matrix resin, and the thermoplastic resin used here can also be selected from the group of thermoplastic resins exemplified as the matrix resin.

Preferably, a thermoplastic resin is selected which has a melting point lower than the molding temperature at which a fiber-reinforced sheet (prepreg sheet) with the matrix resin composed of a thermosetting resin is molded and cured. The lower limit of the melting point of the thermoplastic resin is not particularly limited, but it is preferably 80° C. or higher, more preferably 100° C. or higher from the viewpoint of exhibiting heat resistance in application of the housing of the present invention to an electronic device. In addition, the form of the thermoplastic resin is not particularly limited, and examples thereof include forms of films, continuous fibers, woven fabrics, particles, nonwoven fabrics and the like, but from the viewpoint of handling characteristics during molding operation, forms of films and nonwoven fabrics are preferable. By selecting such a resin, the thermoplastic resin is melted during molding, and the thermoplastic resin is formed while spreading like a film over a surface of a molded product, so that the bonding area increases during joining, or the reinforcing fibers of the fiber-reinforced sheet are impregnated with the thermoplastic resin to form a strong thermoplastic resin layer, so that high peeling strength can be exhibited. The thermoplastic resin may be provided on at least one of the reinforcing structure 3 obtained in the above-mentioned method and the bottom cover 2 or the top cover 4 joined to the reinforcing structure 3, but it is preferable that the thermoplastic resin is provided on the joining members of both the members to be joined. In addition, it is preferable that substantially the same thermoplastic resin is selected as thermoplastic resins to be provided.

In this specification, the "disassembling adhesive" means that the reinforcing structure 3 can be not only easily removed, but also re-bonded, and in re-bonding, the thermoplastic resin may be provided, but it is preferable that the reinforcing structure can be re-bonded without increasing the weight of the thermoplastic resin or the like. In addition, the peeling load in re-bonding is preferably 50% or more, more preferably 70% or more, of the original peeling load. The disassembling adhesive in the present invention can be attained by applying to a joining technique such characteristics of a thermoplastic resin that the resin is melted by heating to reduce dynamic characteristics, and the resin is solidified by cooling or at normal temperature to exhibit high dynamic characteristics specific to the resin.

In addition, a hole can be formed in each of the flat portion 31, the rising wall member 32 and the joining portion 33 of the reinforcing structure 3 to the extent that torsional rigidity in the present invention is improved. With such a structure, it is possible to dispose a wiring cable for connecting an electronic component built in the hollow structure S1 to an electronic component disposed in a space (space S3 as described later) other than the hollow structure S1 divided by the bottom cover 2 and the top cover 4, and a display, a key board and so on which correspond to the top cover 4. From the viewpoint of heat dissipation, it is preferable that the hole is disposed to so as to improve the flow of air, e.g. the hole is formed on the opposed rising wall member 32. The area of the holes is preferably 30% or less of the surface area of the reinforcing structure 3, and is more desirably 15% or less of the surface area of the reinforcing structure 3 from the viewpoint of torsional rigidity.

The top cover 4 is joined to the rim of the rising wall member 22 of the bottom cover 2. In FIG. 1, the top cover 4 has a smooth plate shape, but may have a plate shape having a curved surface or irregularities. The material and shape of the top cover 4 may be the same as those of the bottom cover 2, and a plurality of reinforcing structures may be disposed and joined in a space by dividing the reinforcing member 3 by the bottom cover 2 and the top cover 4. With such a configuration, the housing 1 having high rigidity on either of surfaces thereof can be obtained. In addition, the top cover 4 may be an electronic component such as a liquid crystal display or a keyboard, and with such a configuration, application to a clamshell-type personal computer or a tablet-type personal computer is possible.

As is evident from the above description, the housing 1 according to the first embodiment of the present invention includes: the bottom cover 2; the top cover 4; and the reinforcing structure 3 that is disposed in a space divided by the bottom cover 2 and the top cover 4 and has the flat portion 31, the rising wall member 32 erected on the rim of the flat portion 31, and the joining portion 33 extending from the rim of the rising wall member 32. The joining portion 33 of the reinforcing structure 3 is joined to the bottom cover 2 or the top cover 4, the area of the joining portion 33 is within a range of 10 $cm^2$ or more and 100 $cm^2$ or less, and the maximum value of the height h of the reinforcing structure 3 is within a range of 3 mm or more and 30 mm or less. Accordingly, there can be provides a housing having improved torsional rigidity while having a reduced thickness and weight.

Second Embodiment

A housing according to a second embodiment of the present invention will now be described with reference to FIGS. 8 to 10. The housing according to the second embodiment of the present invention is characterized by a configuration of a reinforcing structure and a projected area of the reinforcing structure. Thus, in the following description, only the configuration of the reinforcing structure and the projected area of the reinforcing structure in the housing according to the second embodiment of the present invention will be described, and description of other configurations will be omitted.

Figure 8:
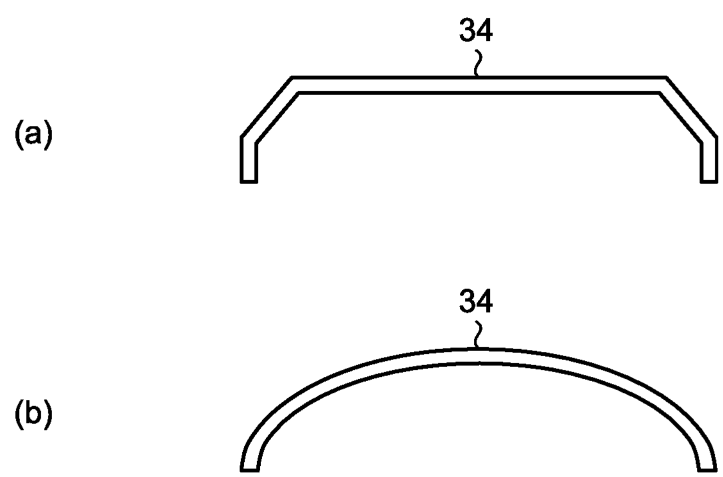
FIGS. 8(*a*) and 8(*b*) are sectional views showing a configuration of a reinforcing structure in a housing according to a second embodiment of the present invention.

FIGS. 8(*a*) and 8(*b*) are sectional views showing a configuration of a reinforcing structure in a housing according to a second embodiment of the present invention. FIGS. 9(*a*) and 9(*b*) show plan views and sectional views showing projected areas of respective members in the housing according to the second embodiment of the present invention. FIGS. 10(*a*) and 10(*b*) show plan views and sectional views showing an arrangement of the reinforcing structure in the housing according to the second embodiment of the present invention. In the housing according to the second embodiment of the present invention, a reinforcing structure 3 includes a reinforcing structure 34 having an opening, and a rim of the reinforcing structure 34 having the opening is joined to a bottom cover 2 or a top cover 4 to form a hollow structure S1 as shown in FIGS. 8(*a*) and 8(*b*). As used herein, the term "reinforcing structure having an opening" refers to a shape having an opening in a part of the reinforcing structure, and may be a member having a joining portion as described above and shown in FIGS. 7(*a*) and 7(*b*). That is, one example of the reinforcing structure having an opening is a reinforcing structure in the first embodiment, i.e. a reinforcing structure having a flat portion, a rising wall member erected on a rim of the flat portion, and a joining portion extending from the rim of the rising wall member, or a curved portion, and a joining portion extending from a rim of the curved.

Figure 9:
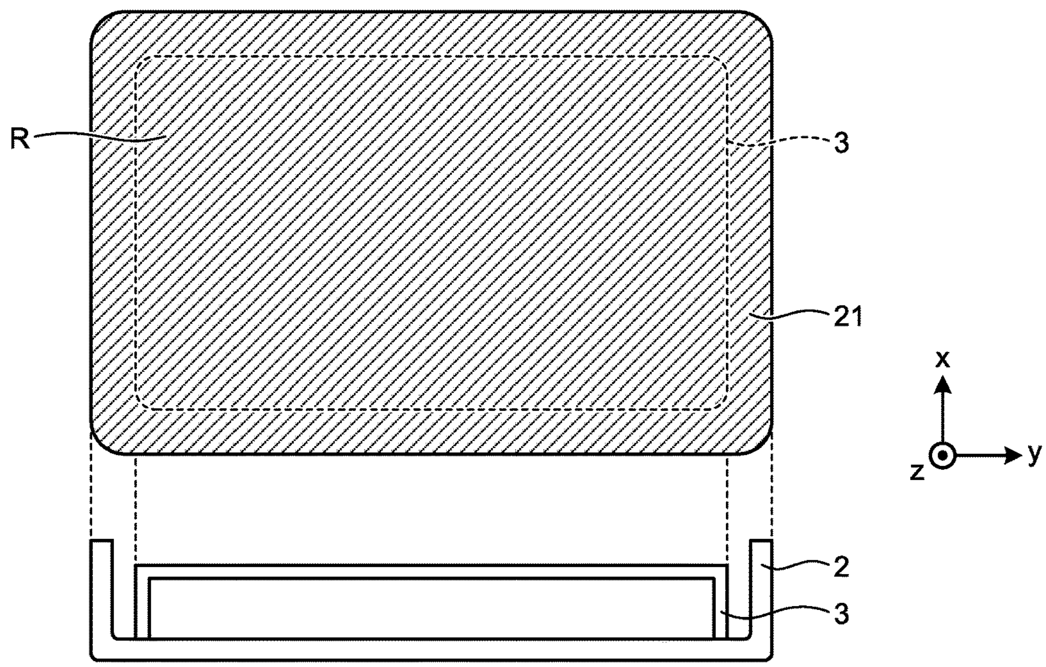
FIGS. 9(*a*) and 9(*b*) show plan views and sectional views showing projected areas of respective members in the housing according to the second embodiment of the present invention.
Figure 9:
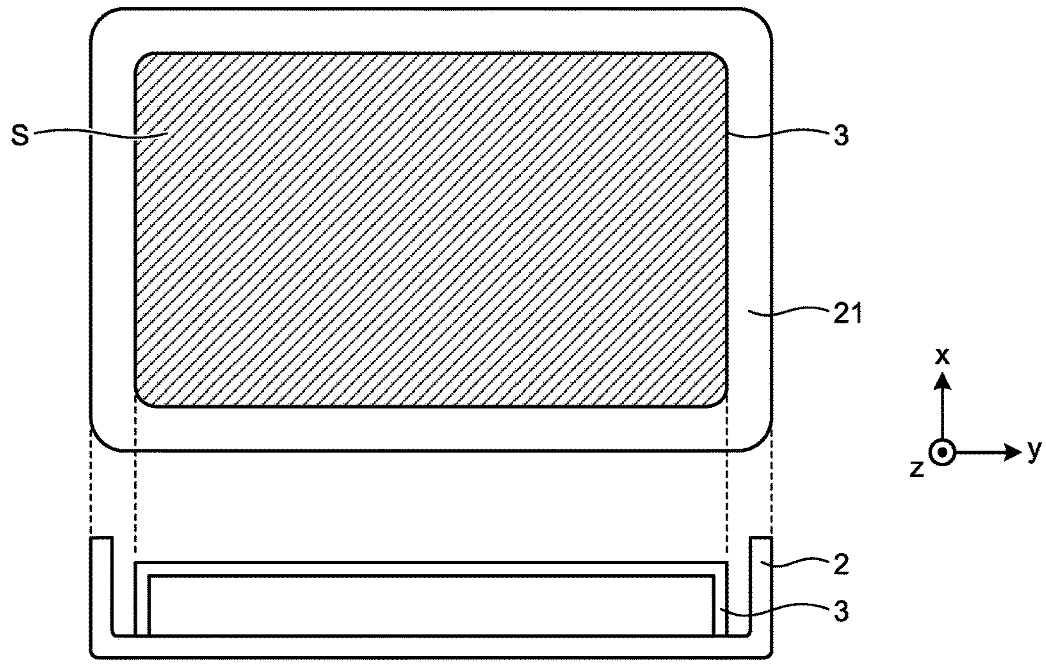
Figure 10:
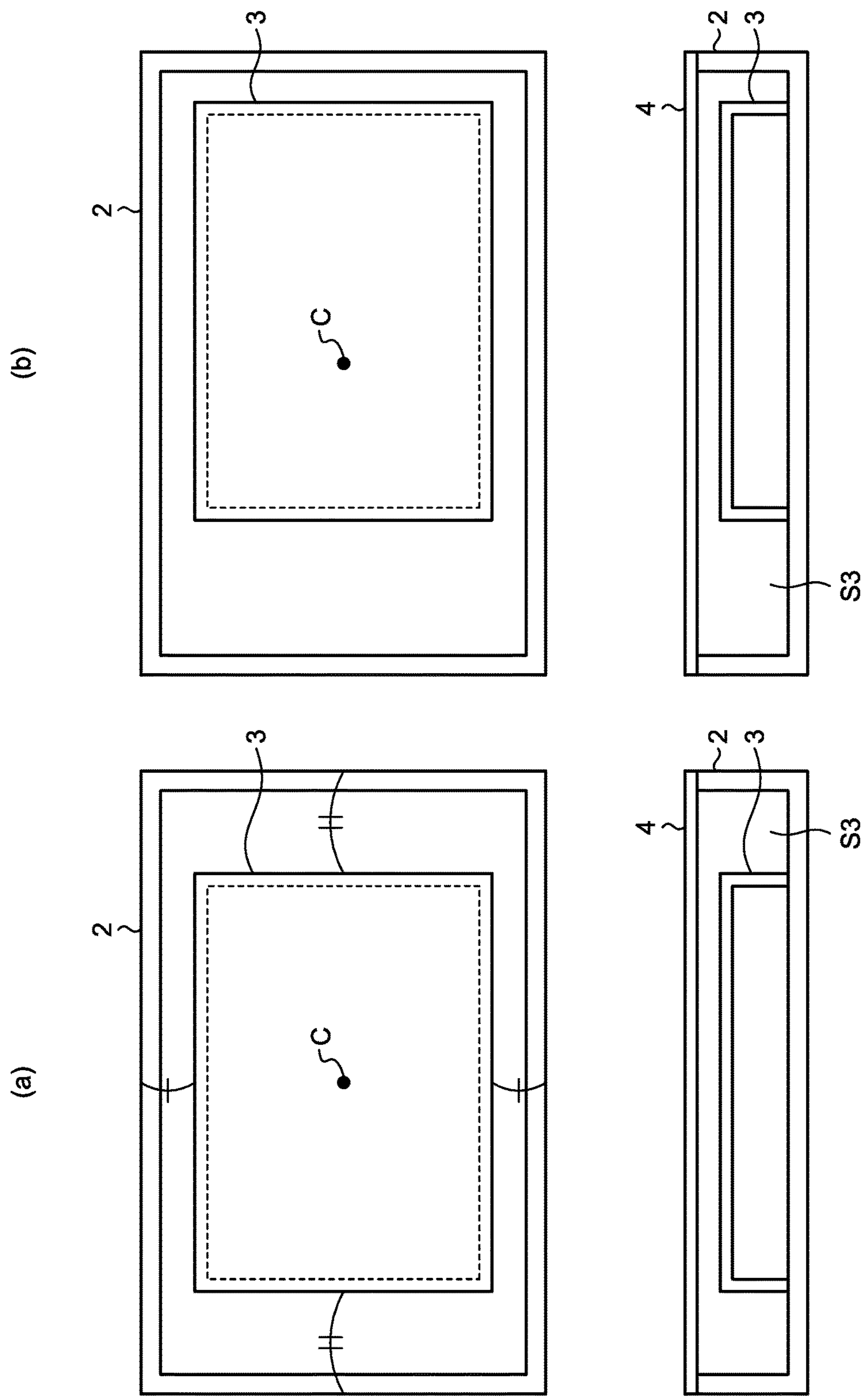
FIGS. 10(*a*) and 10(*b*) show plan views and sectional views showing an arrangement of the reinforcing structure in the housing according to the second embodiment of the present invention.

In the present embodiment, the projected area S of the reinforcing structure 3 in a direction of the bottom cover 2 or the top cover 4 to which the rim is joined is adjusted within a range of 60% or more and 95% or less of the projected area R of the bottom cover 2 or the top cover 4 to which the rim is jointed as shown in FIGS. 9(*a*) and 9(*b*). FIG. 9(*a*) shows the projected area R of the bottom cover 2 or the top cover 4, and FIG. 9(*b*) shows the projected area S of the reinforcing structure 3 when the rim of the reinforcing structure 3 is joined to the bottom cover 2. The disposed position of the reinforcing structure 3 is not particularly limited, but it is preferable that the reinforcing structure 3 is positioned equally from the center position C of the bottom cover 2 or the top cover 4 as shown in FIG. 10(*a*), and by disposing the reinforcing structure 3 in this manner, torsional rigidity in an x direction or a y direction can be made isotropic. In addition, from the viewpoint of effectively utilizing the space S3, the reinforcing structure 3 may be placed on any one of the bottom cover 2 or the top cover 4 as shown in FIG. 10(*b*).

Specifically, when the projected area S is less than 60% of the area of the bottom cover 2 or the top cover 4 to which the reinforcing structure 3 is joined, there arises the problem that the rising wall member that is one factor of exhibiting torsional rigidity in the present invention is formed at a position close to the center position of the bottom cover 2 or the top cover 4, so that original torsional rigidity cannot be exhibited. On the other hand, when the projected area S is more than 95% of the area of the bottom cover 2 or the top cover 4 to which the reinforcing structure 3 is joined, high torsional rigidity can be exhibited, but there arises the problem that the space S3 becomes small, and therefore it is difficult to dispose electronic components and wiring and the like for forming an electronic device, so that application as a housing is difficult. Thus, the projected area S of the reinforcing structure 3 in a direction of the bottom cover 2 or the top cover 4 to which the peripheral portion is joined is within a range of 60% or more and 95% or less of the area R of the bottom cover 2 or the top cover 4 to which the rim is joined.

In the present invention, the projected area of the reinforcing structure 3 in a direction of the bottom cover 2 or the top cover 4 to which the joining portion is joined is preferably within a range of 60% or more and 95% or less of the area of the bottom cover 2 or the top cover 4 to which the joining portion is joined, and therefore, in the present invention, rather than an aspect in which the reinforcing structure 3 and the bottom cover 2 or the top surface cover 4 are joined to each other at a lateral surface, an aspect in which the joining portion of the reinforcing structure 3 is joined to the flat portion of the bottom cover 2 or the top cover 4 as long as, for example, the reinforcing structure 3 has the flat portion, the rising wall member erected on the rim of the flat portion, and the joining portion extending from the rim of the rising wall member, and the bottom cover 2 or the top cover 4 joined to the reinforcing structure 3 has a flat portion.

Here, the shape of the projected surface of the reinforcing structure 3, i.e. the shape of the flat portion 31 is not particularly limited, and may be not only a rectangular shape, but also a circular shape or a polygonal shape, and from the viewpoint of exhibiting high deflection rigidity, a shape conforming to the shape of the bottom cover 2 and/or the top cover 4 is preferable. Specifically, in the example shown in FIG. 1, the shape of the projected surface of the reinforcing structure 3 is preferably a rectangular shape. In addition, from the viewpoint of effectively utilizing the hollow structure S1 and a space other than the hollow structure S1, the shape of the projected surface of the reinforcing structure 3 is preferably a shape conforming to the shape of an electronic component to be packed. In addition, from the viewpoint of exhibiting isotropic rigidity against any load, the shape of the projected surface of the reinforcing structure 3 is preferably a shape that is symmetric with respect to an axis in the x direction and/or the y direction.

As is evident from the above description, the housing 1 according to the second embodiment of the present invention includes: the bottom cover 2; the top cover 4; and the reinforcing structure 3 that is disposed in a space divided by the bottom cover 2 and the top cover 4 and has the opening. The rim of the reinforcing structure 3 is joined to the bottom cover 2 or the top cover 4, and the projected area of the reinforcing structure 3 in a direction of the bottom cover 2 or the top cover 4 to which the rim of the reinforcing structure 3 is joined is within a range of 60% or more and 95% or less of the area of the bottom cover 2 or the top cover 4 to which the rim of the reinforcing structure 3 is joined. Accordingly, there can be provides a housing having improved torsional rigidity while having a reduced thickness and weight.

Third Embodiment

Finally, a housing according to a third embodiment of the present invention will be described with reference to FIG. 11. A housing 1 according to the third embodiment of the present invention is characterized by a configuration of a reinforcing structure and a volume of a hollow structure S1 formed by the reinforcing structure. Thus, in the following description, only the configuration of the reinforcing structure and the volume of the hollow structure S1 formed by the reinforcing structure in the housing according to the third embodiment of the present invention will be described, and description of other configurations will be omitted.

Figure 11:
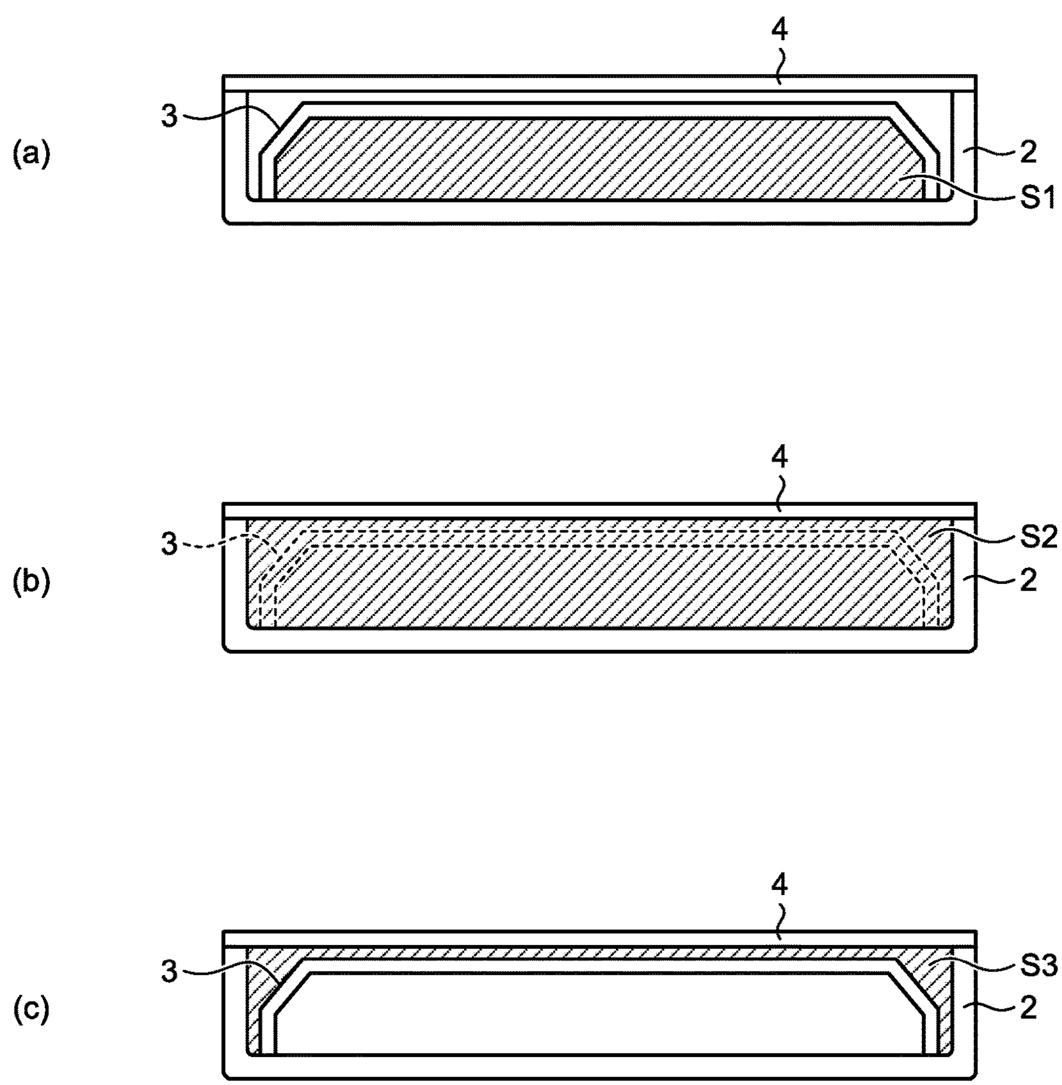
FIGS. 11(*a*) to 11(*c*) are sectional views showing spaces in a housing according to a third embodiment of the present invention.

FIGS. 11(*a*) to 11(*c*) are sectional views showing spaces in a housing according to a third embodiment of the present invention. In the housing according to the third embodiment of the present invention, the reinforcing structure includes a reinforcing structure 34 having an opening, and a rim of the reinforcing structure 34 having the opening is joined to a bottom cover 2 or a top cover 4 to form a hollow structure S1 as in the case of the housing according to the second embodiment.

In addition, in the present embodiment, the volume of the hollow structure S1 formed by the reinforcing structure 3 in the bottom cover 2 shown in FIG. 11 (*a*) is within a range of 55% or more and 95% or less of the volume of the space S2 divided by the bottom cover 2 and the top cover 4 shown in FIG. 11(*b*). Specifically, when the volume of the hollow structure S1 is less than 55% of the volume of the space S2, there arises the problem that the height of the rising wall member that is one factor exhibiting torsional rigidity in the present invention is low and/or the projected area of the reinforcing structure 3 is small, so that original torsional rigidity cannot be exhibited. On the other hand, when the volume of the hollow structure S1 is more than 95% of the volume of the space S2, high torsional rigidity can be exhibited, but there arises the problem that a space S3 as shown in FIG. 11(*c*) becomes small, and thus it is difficult to dispose electronic components and wiring and the like for forming an electronic device, so that application as a housing is difficult. Thus, the volume of the hollow structure S1 is within a range of 55% or more and 95% or less of the volume of the space S2 divided by the bottom cover 2 and the top cover 4.

As is evident from the above description, the housing 1 according to the third aspect of the present invention includes: the bottom cover 2; the top cover 4; and the reinforcing structure 3 that is disposed in a space divided by the bottom cover 2 and the top cover 4 and has the opening. The rim of the reinforcing structure 3 is joined to the bottom cover 2 or the top cover 4, and the volume of the hollow structure S1 formed by joining the rim of the reinforcing structure 3 to the bottom cover 2 or the top cover 4 is within a range of 55% or more and 95% or less of the volume S2 divided by the bottom cover 2 and the top cover 4. Accordingly, there can be provides a housing having improved torsional rigidity while having a reduced thickness and weight.

While embodiments of the invention made by the present inventors have been described above, the present invention is not limited by descriptions and drawings constituting a part of the disclosure of the present invention with the embodiments. For example, the housing according to the present invention may be formed by arbitrarily combining the configurations of the housings according to the first, second, and third embodiments. Specifically, the reinforcing structure in the first embodiment may satisfy one or both of the constitutional requirements of the reinforcing structures in the second and third embodiments, or the reinforcing structure in the second embodiment may satisfy the constitutional requirement of the reinforcing structure in the third embodiment. Thus, other embodiments, examples, operational techniques and the like that are made by those skilled in the art on the basis of the embodiments are all included in the scope of the present invention.

EXAMPLES

Hereinafter, the present invention will be described in detail by way of examples. However, the present invention is not limited to the following examples.

<Evaluation and Measurement Methods>

(1) Torsional Rigidity Test

Figure 12:
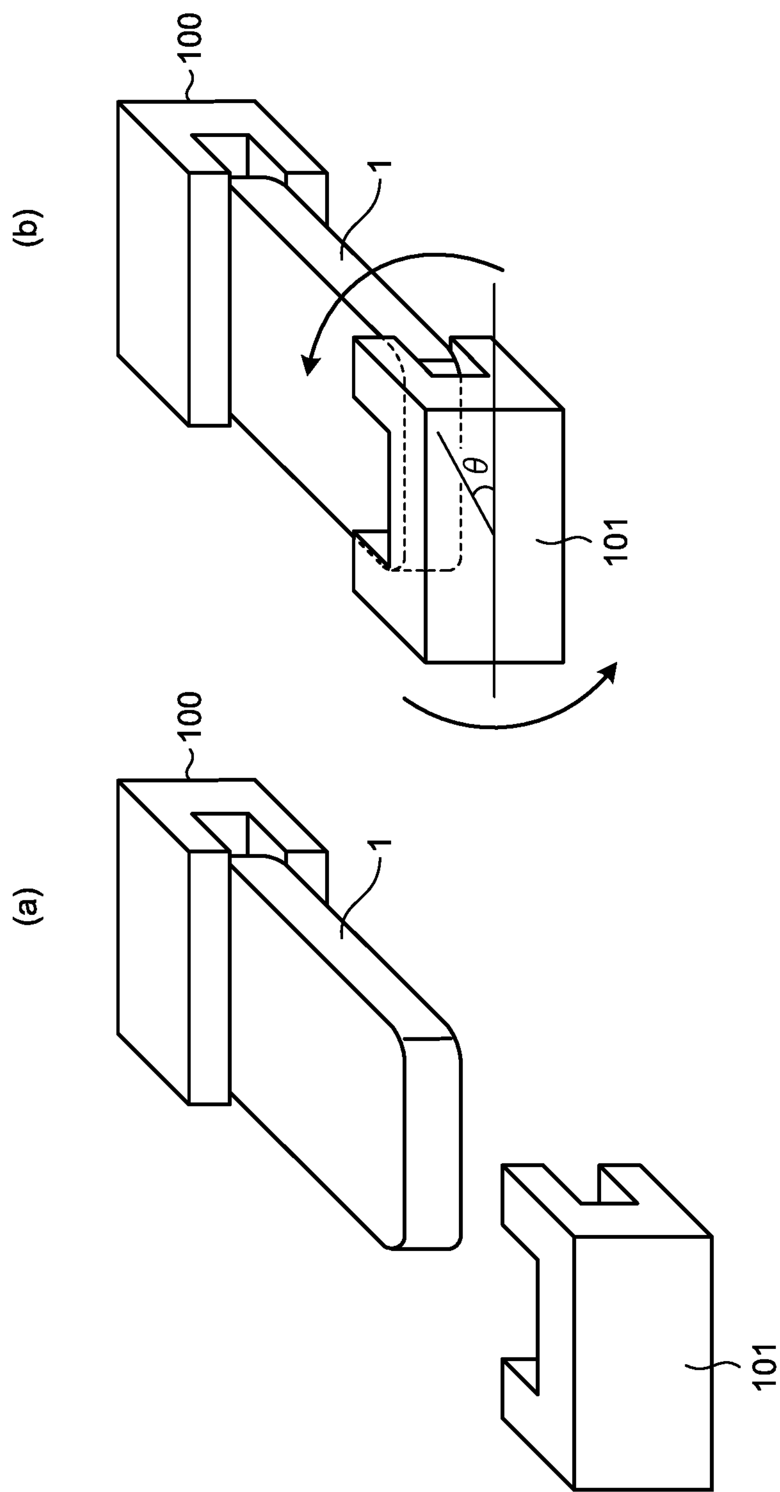
FIGS. 12(*a*) and 12(*b*) are perspective views for illustrating a torsional rigidity test method.

A housing 1 was fixed in a tester in such a manner that one side of the housing 1 was fixed by a U-shaped fixing tool 100, and the other side opposed to the fixed side was held by a support tool 101 as shown in FIG. 12(*a*), the displacement amount of the housing 1 was then measured when a load of 50 N was applied with a change rate set to 1°/min at an angle θ as shown in FIG. 12(*b*), and the measured value was defined as a torsional rigidity value of the housing.

(2) Deflection Rigidity Test

Figure 13:
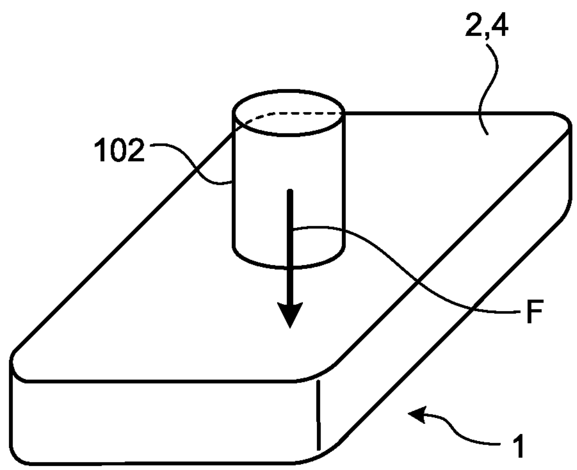
FIG. 13 is a perspective view for illustrating a deflection rigidity test method.

As shown in FIG. 13, the housing was installed in a tester in such a manner that it was able to apply a tensile load F from the side of a bottom cover 2 or a top cover 4 to which a reinforcing structure was joined. "Instron" (registered trademark) Universal Tester Model 4201 (manufactured by Instron Co., Ltd.) was used as a tester. The deflection amount of the bottom cover 2 or the top cover 4 was measured when a load of 100 N was applied with the housing 1 pressed at the center position at a cross head speed of 1.0 mm/min using an indenter 102 having a diameter of 20 mm, and the measured value was defined as a deflection rigidity value.

(3) Evaluation of Flexural Modulus

In accordance with the specifications in ASTM D-790 (1997), the flexural moduli of materials to be used for the reinforcing structure 3, the bottom cover 2 and the top cover 4 were evaluated. From each of members obtained in examples and comparative examples, a bending test piece having a width of 25±0.2 mm with a length set to span L+20±1 mm so that the thickness D and the span L satisfied the relationship of L/D=16 was cut for the four directions: 0°, +45°, −45° and 90° directions where a certain direction was set to the 0° direction. In this way, test pieces were prepared. The number of measurements (n) in each direction was 5, and the average value of all measured values (n=20) was defined as a flexural modulus. "Instron" (registered trademark) Universal Tester Model 4201 (manufactured by Instron Co., Ltd.) was used as a tester, a three-point bending test tool (indenter diameter: 10 mm, fulcrum diameter: 10 mm) was used, the support span was set to 16 times of the thickness of the test piece, and the bending elastic modulus was measured. The test was conducted under the following conditions: the moisture content of the test piece was 0.1 mass % or less, the atmospheric temperature was 23° C., and the humidity was 50% by mass.

(4) Peeling Load Test of Reinforcing Structure (23° C. and 200° C.)

Figure 14:
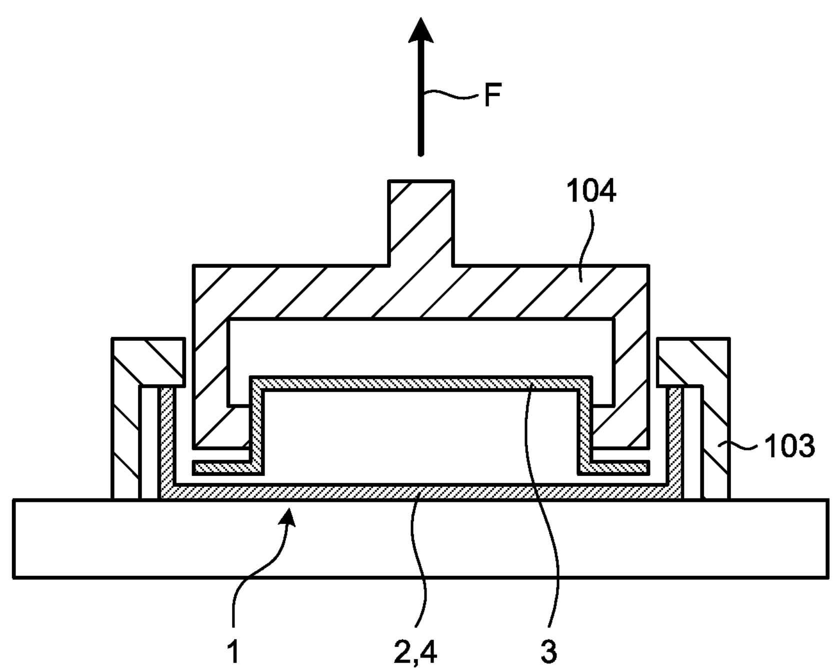
FIG. 14 is a sectional view for illustrating a peeling load test method.

The peeling load of the reinforcing structure was evaluated in accordance with "Testing methods for tensile strength of adhesive bonds" specified in JIS K6849 (1994). As test pieces in this test, housings obtained in examples and comparative examples were used. Here, for measuring the peeling strength of the reinforcing structure, evaluation was performed in a state in which there was not a top cover or bottom cover to which the reinforcing structure was not joined (before the reinforcing structure was joined). Specifically, as shown in FIG. 14, the bottom cover 2 or the top cover 4 of the housing 1 was fixed by a fixing tool 103, and the reinforcing structure 3 was fixed by a tensile tool 104. A tensile load F was applied while each member was fixed, and evaluation was performed until the reinforcing structure 3 was peeled off, or the tensile tool 104 was detached from the reinforcing structure 3. The bonding area here was calculated by measuring the width and length of the joining surface of the reinforcing structure 3 before joining. When joining was partially performed, the areas thereof were measured, and summed to determine a joining area. The peeling load of the reinforcing structure 3 was calculated from the resulting tensile load value and joining area. For the peeling load of the reinforcing structure 3 at 200° C., the housing 1 was placed in a thermostat together with the fixing tool, and the atmospheric temperature in the thermostat was elevated to 200° C. After elevation of the temperature, this state was maintained for 10 minutes, and a tensile load was then applied in the same manner as in the peeling load test of the reinforcing structure 3, and evaluation was performed.

<Materials Used>

Materials used for evaluation are shown below.

[Material 1]

"TORAYCA" Prepreg P3252S-12 (manufactured by Toray Industries, Inc.) was provided as material 1. The properties of material 1 are shown in Table 1 below.

[Material 2]

SCF 183 EP-BL 3 manufactured by Super Resin Industry Co., Ltd. was provided as material 2. The properties of material 2 are shown in Table 1 below.

[Material 3]

An aluminum alloy A5052 was provided as material 3. The properties of material 3 are shown in Table 1 below.

[Material 4]

A magnesium alloy AZ31 was provided as material 4. The properties of material 4 are shown in Table 1 below.

[Material 5]

A titanium alloy Ti-6Al-4V was provided as material 5. The properties of material 5 are shown in Table 1 below.

[Material 6]

Using a master batch including 90% by mass of a polyamide 6 resin ("AMILAN" (registered trademark) CM1021T manufactured by Toray Industries, Inc.) and 10% by mass of a polyamide terpolymer resin composed of polyamide 6/66/610 ("AMILAN" (registered trademark) CM4000 manufactured by Toray Industries, Inc.), a thermoplastic resin film having a basis weight of 124 g/m$^2$ was prepared, and provided as material 6. The properties of material 6 are shown in Table 1 below.

[Material 7]

Resin pellets of a polycarbonate resin ("Iupilon" (registered trademark) H-4000" manufactured by Mitsubishi Engineering-Plastics Corporation) were provided as material 7. Before molding, the resin pellets were dried for 5 hours using a hot air circulating dryer with the inside temperature set to 120° C. The properties of material 7 are shown in Table 1 below.

TABLE 1

| | | Material 1 | Material 2 | Material 3 | Material 4 | Material 5 | Material 6 | Material 7 |
|---|---|---|---|---|---|---|---|---|
| Material | — | CFRP | GFRP | Al alloy | Mg alloy | Ti alloy | Ny resin | PC resin |
| Elastic modulus | GPa | 60 | 25 | 70 | 45 | 113 | 3.5 | 2.3 |
| Linear expansion coefficient | $10^{-6}$/° C. | 0.3 | 7 | 23.6 | 26 | 8.2 | 83 | 65 |
| Thermal conductivity | W/m · K | 3.0 | 0.3 | 236.0 | 159.0 | 22.0 | 0.3 | 0.2 |

Example 1

Example 1-(1): Preparation of Bottom Cover

Figure 15:
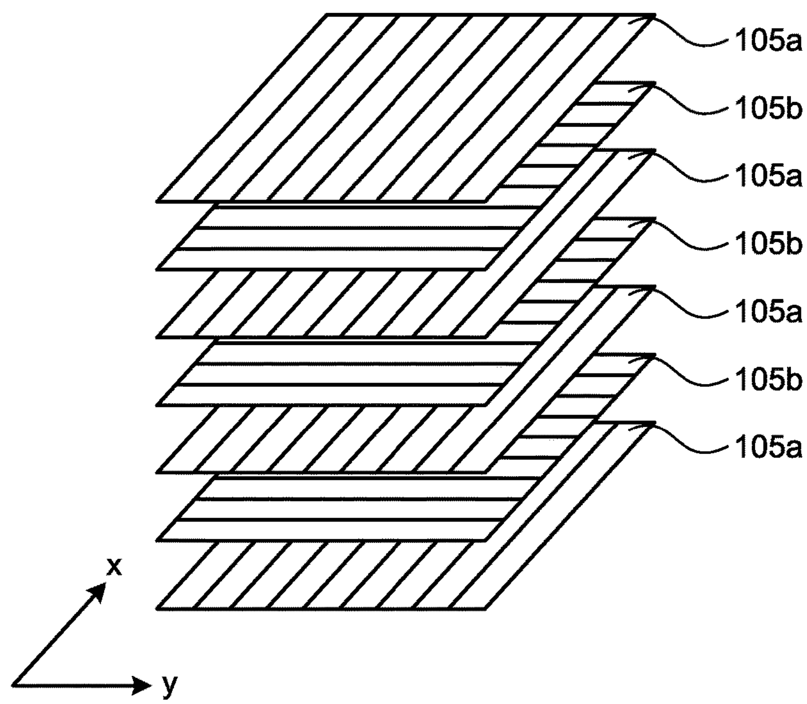
FIG. 15 is a perspective view showing a configuration of a laminate.

Seven sheets having a predetermined size were cut from material 1. Among them, four sheets were cut in such a manner that the fiber direction of a prepreg was parallel to a longitudinal direction (x direction in FIG. 1), and the other three sheets were cut in such a manner that the fiber direction was parallel to a lateral direction (y direction in FIG. 1). In this example, the lateral direction (y direction) was set to 0°, and as shown in FIG. 15, a laminate including seven prepreg sheets was prepared in such a manner that prepreg sheets 105*a* with the fiber direction set to 90° and prepreg sheets 105*b* with the fiber direction set to 0° were symmetrically laminated.

Figure 16:
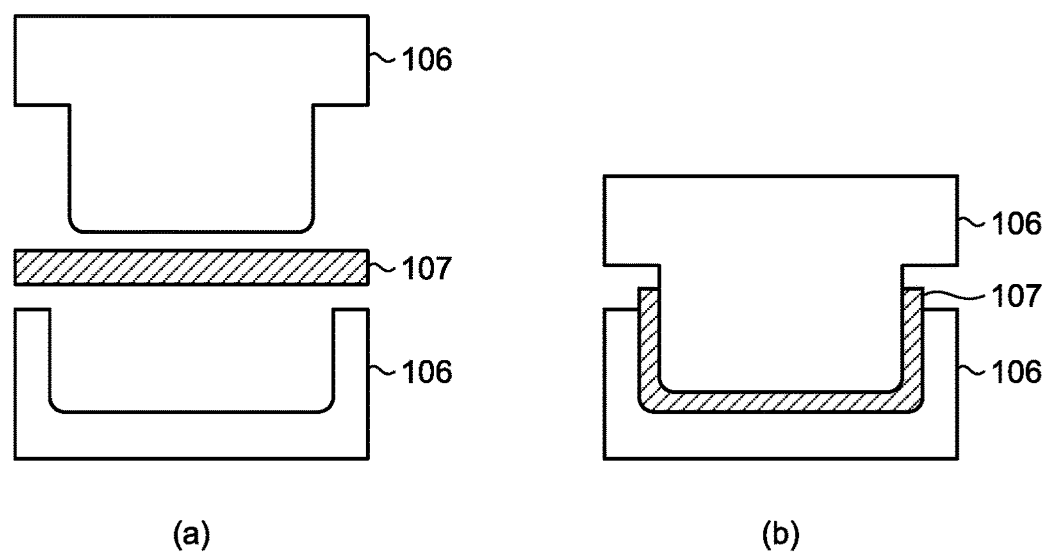
FIGS. 16(*a*) and 16(*b*) are sectional views for illustrating a press molding method.

Here, a press molding apparatus and a pair of molds 106 as shown in FIG. 16(*a*) were used, and the resulting laminate 107 was disposed in a pair of molds 106. Here, the heating platen temperature of the press molding apparatus was set to 150° C., and as shown in FIG. 16(*b*), the molds 106 were moved, and the laminate was pressurized with the molding pressure kept at 1.0 MPa. After 30 minutes, the molds 106 were opened, and the molded article was removed from the molds 106. Trimming was performed so that the rising wall of the resulting molded article had a desired height, thereby obtaining a bottom cover.

Example 1-(2): Preparation of Top Cover

Except that molds configured to prepare a molded article having a smooth shape were used, the same procedure as in Example 1-(1) was carried out to obtain a molded article. Trimming was performed so that the resulting molded article had a desired size, thereby obtaining a top cover.

Example 1-(3): Preparation of Reinforcing Structure

Figure 17:
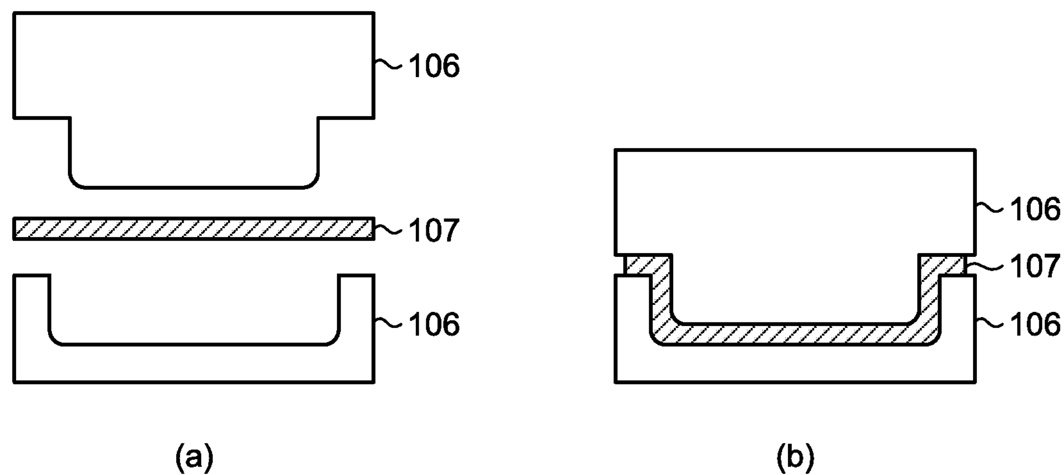
FIGS. 17(*a*) and 17(*b*) are sectional views for illustrating a press molding method.

Except that molds 106 as shown in FIG. 17 were used, the same procedure as in Example 1-(1) was carried out to obtain a molded article. Trimming was performed so that the joining surface of the resulting molded article had a desired width, thereby obtaining a reinforcing structure.

Example 1-(4): Preparation of Housing

Figure 18:
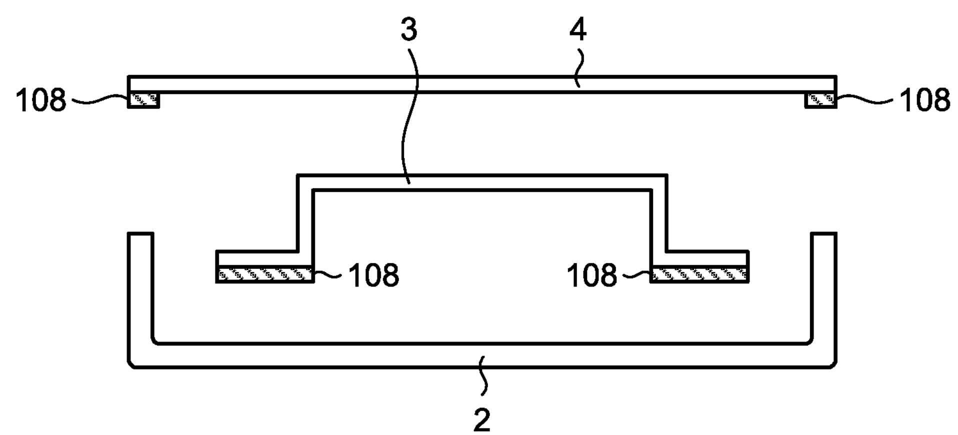
FIG. 18 is a sectional view for illustrating a method for preparing a housing.

The members obtained in Examples 1-(1) to 1-(3) were joined using an adhesive 108 as shown in FIG. 18. The molding conditions and evaluation results in Example 1 are shown in Table 2 below.

Examples 2 and 3

Except that a reinforcing structure having a size as described in Table 2 was molded and used, the same procedure as in Examples 1-(1) to 1-(4) was carried out to obtain a housing. The molding conditions and evaluation results in Examples 2 and 3 are shown in Table 2 below.

Example 4

A bottom cover and a reinforcing structure that were obtained in the same manner as in Examples 1-(1) and 1-(3) were coated with an adhesive at 10 joining portions of the reinforcing structure in such a manner that the joining area at each portion was 6 $mm^2$, and the bottom cover and the reinforcing structure were joined to each other. Except for the method for joining, the same procedure as in Examples 1-(1) to 1-(4) was carried out to obtain a housing. The molding conditions and evaluation results in Example 4 are shown in Table 2 below.

Example 5

Except that a reinforcing structure having a size as described in Table 3 was molded and used, the same procedure as in Examples 1-(1) to 1-(3) was carried out, and for the method for joining the bottom cover and the reinforcing structure to each other, the same procedure as in Example 4 was carried out to obtain a housing. The molding conditions and evaluation results in Example 5 are shown in Table 3 below.

Examples 6 and 7

Except that a reinforcing structure having a size as described in Table 3 was molded and used, the same procedure as in Examples 1-(1) to 1-(4) was carried out to obtain a housing. The molding conditions and evaluation results in Examples 6 and 7 are shown in Table 3 below.

Example 8

As another reinforcing structure, 25 sheets of material 1 were laminated so as to have a thickness of 3 mm with 0° prepreg sheets and 90° prepreg sheets being symmetrically laminated in an alternate manner. In the same manner as in Example 1-(1), the laminate was heated and pressurized by a press molding apparatus to obtain a molded article. The resulting molded article was processed so as to have a height of 7.2 mm, thereby obtaining another reinforcing structure having a size as shown in Table 3. The resulting another reinforcing structure was disposed as shown in FIG. 6, and joined by an adhesive, and subsequently the same procedure as in Examples 1-(1) to 1-(4) to obtain a housing. The molding conditions and evaluation results in Example 8 are shown in Table 3 below.

Example 9

As another reinforcing structure, a flat plate was obtained by injection-molding material 7 with the cylinder temperature and the mold temperature set to 280° C. and 100° C., respectively, using molds configured to attain a thickness of 3 mm, and an injection molding machine. The resulting flat plate was processed so as to have a width of 7.2 mm, thereby obtaining another reinforcing structure having a size as shown in Table 3. Except that the resulting another reinforcing structure was used, the same procedure as in Example 8 was carried out to obtain a housing. The molding conditions and evaluation results in Example 9 are shown in Table 4 below.

Example 10

Except that a reinforcing structure having a size as described in Table 4 was molded and used, the same procedure as in Examples 1-(1) to 1-(4) was carried out to obtain a housing. The molding conditions and evaluation results in Example 10 are shown in Table 4 below.

Example 11

A bottom cover and a reinforcing structure that were obtained in the same manner as in Examples 1-(1) and (3) were joined to each other in the following manner: a molten hot melt resin (HM712 manufactured by Cemedine Co., Ltd.) was applied to a joining portion of the reinforcing structure by a hot melt applicator at 140° C., a reinforcing structure was superposed thereon, a weight was placed on the reinforcing structure, and this state was kept for 3 minutes. Except for the method for joining, the same procedure as in Examples 1-(1) to 1-(4) was carried out to obtain a housing. The molding conditions and evaluation results in Example 11 are shown in Table 4 below.

Example 12

Example 12-(1): Preparation of Bottom Cover

A film composed of a polyamide copolymer ("AMILAN" (registered trademark) CM8000 manufactured by Toray Industries, Inc.) and having a thickness of 50 μm was laminated on a surface to be joined to the reinforcing structure, thereby obtaining a laminate. Except that the resulting laminate was used, the same procedure as in Example 1-(1) was carried out to obtain a bottom cover.

Example 12-(2): Preparation of Top Cover

As in the case of Example 12-(1), a film composed of a polyamide copolymer ("AMILAN" (registered trademark) CM8000 manufactured by Toray Industries, Inc.) and having a thickness of 50 μm was laminated on a surface to be joined to the bottom cover, thereby obtaining a laminate. Except that the resulting laminate was used, the same procedure as in Example 1-(2) was carried out to obtain a top cover.

Example 12-(3): Preparation of Reinforcing Structure

As in the case of Example 12-(1), a film composed of a polyamide copolymer ("AMILAN" (registered trademark) CM8000 manufactured by Toray Industries, Inc.) and having a thickness of 50 μm was laminated on a surface to be joined to the bottom cover, thereby obtaining a laminate. Except that the resulting laminate was used, the same procedure as in Example 1-(3) was carried out to obtain a reinforcing structure.

Example 12-(4): Preparation of Housing

Figure 19:
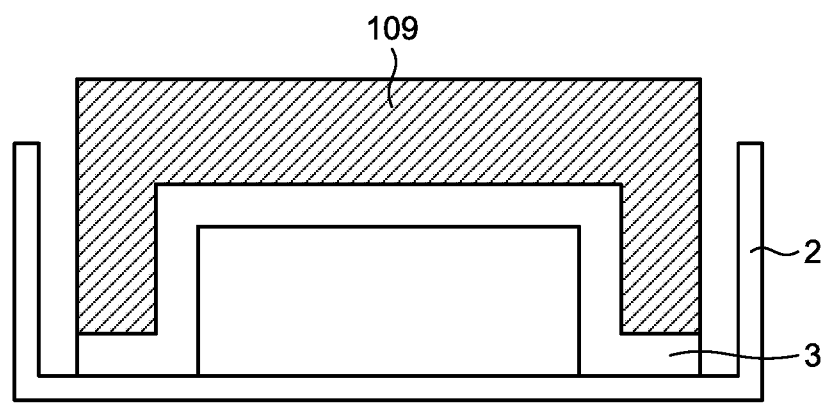
FIG. 19 is a sectional view for illustrating thermal welding of a reinforcing structure to a bottom cover in Example 12 using a joining tool.

The reinforcing structure obtained in Example 12-(3) and the bottom cover obtained in Example 12-(1) were superposed on each other in joined form, a joining tool 109 as shown in FIG. 19 was provided, and the joined bottom cover and reinforcing structure were disposed, and heated and pressurized in a press molding apparatus set so that the joining tool 109 had a surface temperature of 180° C. After 1 minute, the bottom cover 2, the reinforcing structure 3 and the joining tool 109 were taken out from the press molding apparatus, and cooled. After 5 minutes, the joining tool 109 was removed to obtain an integrated product of the bottom cover 2 and the reinforcing structure 3. Thereafter, the top cover 4 was joined using an adhesive in the same manner as in Example 1-(4). The molding conditions and evaluation results in Example 12 are shown in Table 4 below.

Examples 13 and 14

Except that a reinforcing structure having a size as described in Table 5 was molded and used, the same procedure as in Examples 12-(1) to 12-(4) was carried out to obtain a housing. The molding conditions and evaluation results in Examples 13 and 14 are shown in Table 5 below.

Example 15

A bottom cover and a reinforcing structure that were obtained in the same manner as in Examples 12-(1) and 12-(3) were joined to each other at 10 joining portions of the reinforcing structure by an ultrasonic welding method. Except for the method for joining, the same procedure as in Examples 1-(1) to 1-(4) was carried out to obtain a housing. The molding conditions and evaluation results in Example 15 are shown in Table 5 below.

Example 16

Except that a reinforcing structure having a size as described in Table 5 was molded and used, the same procedure as in Examples 12-(1) to 12-(3) was carried out, and for the method for joining the bottom cover and the reinforcing structure to each other, the same procedure as in Example 15 was carried out to obtain a housing. The molding conditions and evaluation results in Example 16 are shown in Table 5 below.

Examples 17 and 18

Except that a reinforcing structure having a size as described in Table 6 was molded and used, the same procedure as in Examples 12-(1) to 12-(4) was carried out to obtain a housing. The molding conditions and evaluation results in Examples 17 and 18 are shown in Table 6 below.

Example 19

Figure 20:
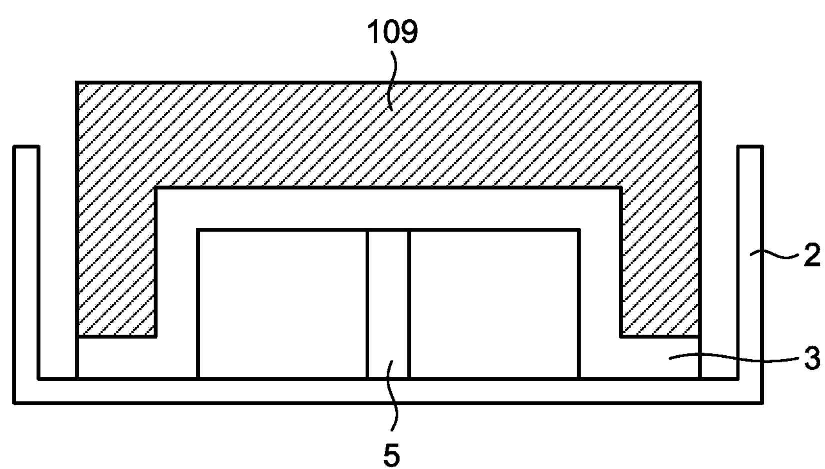
FIG. 20 is a sectional view for illustrating thermal welding of a reinforcing structure and another reinforcing structure to a bottom cover in Example 19 using a joining tool.

Except that the other reinforcing structure obtained in Example 8 was used, and the resulting the other reinforcing structure 5, the bottom cover 2 and the reinforcing structure 3 were disposed as shown in FIG. 20, the same procedure as in Example 12-(4) was carried out to obtain a housing. The molding conditions and evaluation results in Example 19 are shown in Table 6 below.

Example 20

Except that the other reinforcing structure obtained in Example 9 was used, the same procedure as in Example 19 was carried out to obtain a housing. The molding conditions and evaluation results in Example 20 are shown in Table 6 below.

Example 21

Except that a reinforcing structure having a size as described in Table 7 was molded and used, the same procedure as in Examples 12-(1) to 12-(4) was carried out to obtain a housing. The molding conditions and evaluation results in Example 21 are shown in Table 7 below.

Example 22

Except that as the bottom cover, a material as described in Table 7 was used, the heating platen temperature was 220° C., and the molding pressure was 10 MPa, the same procedure as in Example 1 was carried out to obtain a housing. The molding conditions and evaluation results in Example 22 are shown in Table 7 below.

Example 23

Except that as the bottom cover, a material as described in Table 7 was used, the heating platen temperature was 200° C., and the molding pressure was 10 MPa, the same procedure as in Example 1 was carried out to obtain a housing. The molding conditions and evaluation results in Example 23 are shown in Table 7 below.

Example 24

Except that as the bottom cover, a material as described in Table 7 was used, the heating platen temperature was 240° C., and the molding pressure was 10 MPa, the same procedure as in Example 1 was carried out to obtain a housing. The molding conditions and evaluation results in Example 23 are shown in Table 7 below.

Example 25

Except that as the bottom cover, a material as described in Table 8 was used, the same procedure as in Example 1 was carried out to obtain a housing. The molding conditions and evaluation results in Example 25 are shown in Table 7 below.

Example 26

Except that as the reinforcing structure, a material as described in Table 8 was used, the same procedure as in Example 1 was carried out to obtain a housing. The molding conditions and evaluation results in Example 26 are shown in Table 8 below.

Examples 27 and 28

Except that a reinforcing structure having a size as described in Table 8 was molded and used, the same procedure as in Examples 1-(1) to 1-(4) was carried out to obtain a housing. The molding conditions and evaluation results in Examples 27 and 28 are shown in Table 8 below.

Example 29

Except that a reinforcing structure having a size as described in Table 9 was molded and used, and the members were joined by thermal welding, the same procedure as in Example 22 was carried out to obtain a housing. The molding conditions and evaluation results in Example 29 are shown in Table 9 below.

Example 30

Example 30-(1): Preparation of Bottom Cover

A laminate obtained by laminating 10 sheets of material 6, a press molding apparatus, and a pair of molds 106 as shown in FIG. 16(*a*) were used. The laminate was disposed in a pair of molds 106. Here, the heating platen temperature of the press molding apparatus was set to 260° C., and the laminate was pressurized with the molding pressure kept at 1.0 MPa. After 10 minutes, cooling water was made to pass through the heating plate, so that cooling was started. After the mold temperature decreased to 100° C. or lower, the molds 106 were opened, and a molded article was taken out from the molds 106. Trimming was performed so that the rising wall of the resulting molded article had a desired height, thereby obtaining a bottom cover.

Example 30-(2): Preparation of Reinforcing Structure and Top Cover

Except that the mold to be used was changed so as to attain a size as described in Table 9, the same procedure as in Example 30-(1) was carried out to obtain a reinforcing structure and a top cover.

Example 30-(3): Preparation of Housing

The resulting bottom cover and reinforcing structure were superposed on each other in a joined form, and joined using an ultrasonic welding machine. Thereafter, the top cover was joined using an adhesive in the same manner as in Example 12-(4). The molding conditions and evaluation results in Example 30 are shown in Table 9 below.

Reference Example 1

Except that a size as described in Table 9 was employed, the same procedure as in Example 12 was carried out to obtain a bottom cover and a reinforcing structure. Electronic components were disposed in a hollow structure S1 formed by the bottom cover and the reinforcing structure, and a space S3, and a joining portion was joined by an ultrasonic welding machine in the same manner as in Example 30. In addition, as a top cover, a liquid crystal display was provided, and joined to a bottom member by a double-sided tape. The molding conditions and evaluation results in the electronic device obtained in Reference Example 1 are shown in Table 9 below.

Comparative Example 1

Except that a reinforcing structure was not used, the same procedure as in Example 1 was carried out to obtain a housing. The molding conditions and evaluation results in Comparative Example 1 are shown in Table 10 below.

Comparative Example 2

Except that a laminate obtained by laminating material 1 and material 2 was used as a material of a bottom cover, the same procedure as in Comparative Example 1 was carried out to obtain a housing. The molding conditions and evaluation results in Comparative Example 2 are shown in Table 10 below.

Comparative Examples 3 and 4

Except that a size as described in Table 10 was employed, the same procedure as in Example 1 was carried out to obtain a housing. The molding conditions and evaluation results in Comparative Examples 3 and 4 are shown in Table 10 below.

[Evaluation]

The housings obtained in examples were confirmed to exhibit high torsional rigidity. Among them, the housing of Example 1 exhibited very high torsional rigidity, and was also capable of mounting many electronic devices etc. in a hollow structure because the ratio of the hollow structure was high. It was confirmed that in Examples 8 and 9, not only torsional rigidity but also deflection rigidity was exhibited due to the effect of another reinforcing structure. In Example 9, an effect was exhibited against not only a static load but also a dynamic load (impact). Examples 11 to 21, 29, and 30 are preferable from the viewpoint of repair and recycling because the top cover and the reinforcing structure are joined to each other by heat welding, and therefore the joining portion can be disassembled by heating while high torsional rigidity and deflection rigidity are exhibited. Examples 10 to 21, 29, and 30 are preferable from the viewpoint of weight reduction because the reinforcing structure and the bottom cover are bonded directly to each other, and therefore an increase in weight is smaller as compared to a case where an adhesive or a hot melt resin is used.

In Examples 22 to 25 and 29, not only high torsional rigidity but also deflection rigidity was exhibited by using a metal material having high dynamic characteristics for the bottom cover. In addition, the metal material has a high thermal conductivity, and is therefore preferable from the viewpoint of thermal characteristics. Example 26 is preferable from the viewpoint of not only high torsional rigidity but also enabling radio wave communication because a non-conductive material having electromagnetic wave permeability is used for the bottom cover. Examples 27 and 28 are intended to reduce the thickness of each member, and thus contributes to weight reduction and thickness reduction of the housing while maintaining torsional rigidity. In Example 30, a resin material was used for each member, and it was confirmed that while having poor deflection rigidity, the housing exhibited torsional rigidity. In addition, Reference Example 1 was provided as a method for using a housing, where electronic components were disposed in a hollow structure to prepare an electronic device with a liquid crystal display used as a top cover. It was confirmed that when the requirements of the present invention were satisfied, it was possible to provide an electronic device exhibiting high torsional rigidity and deflection rigidity.

On the other hand, the housings of Comparative Examples 1 and 2 had very low resistance to torsion, so that there was the possibility of damaging internal electronic components. In Comparative Examples 3 and 4, a reinforcing structure was used, but the requirements of the present invention were not satisfied, and it was impossible to exhibit satisfactory torsional rigidity.

TABLE 2

| | | Example 1 | Example 2 | Example 3 | Example 4 |
|---|---|---|---|---|---|
| Bottom cover: | | | | | |
| Material | — | Material 1 | Material 1 | Material 1 | Material 1 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.8 | 0.8 |
| Projected area | $cm^2$ | 630 | 630 | 630 | 630 |
| Volume | $cm^3$ | 572 | 572 | 572 | 572 |
| Top cover: | | | | | |
| Material | — | Material 1 | Material 1 | Material 1 | Material 1 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | $cm^2$ | 630 | 630 | 630 | 630 |
| Volume | $cm^3$ | — | — | — | — |
| Reinforcing structure: | | | | | |
| Material | — | Material 2 | Material 2 | Material 2 | Material 2 |
| Length | mm | 200 | 206 | 200 | 200 |
| Width | mm | 290 | 296 | 290 | 290 |
| Height | mm | 8 | 3 | 2 | 3 |
| Angle | ° | 90 | 90 | 90 | 90 |
| Thickness | mm | 0.8 | 0.8 | 0.8 | 0.8 |
| Overlap width | mm | 5 | 5 | 5 | 5 |
| Bonding area | $cm^2$ | 48 | 49 | 48 | 6 |

TABLE 2-continued

| | | Example 1 | Example 2 | Example 3 | Example 4 |
|---|---|---|---|---|---|
| Projected area | $cm^2$ | 580 | 610 | 580 | 580 |
| Volume | $cm^3$ | 412 | 132 | 69 | 126 |
| Another reinforcing structure | | | | | |
| Material | — | — | — | — | — |
| Length | mm | — | — | — | — |
| Width | mm | — | — | — | — |
| Height | mm | — | — | — | — |
| Electronic device housing | | | | | |
| Projected area ratio | % | 92.1 | 96.8 | 92.1 | 92.1 |
| Volume ratio | % | 72.0 | 23.1 | 12.0 | 22.0 |
| Integration method | — | Adhesive | Adhesive | Adhesive | Adhesive |
| Bonding portion | — | Planar joining | Planar joining | Planar joining | Planar joining |
| Peeling load (23° C.) | $N/cm^2$ | 1500 | 1500 | 1500 | 170 |
| Peeling load (200° C.) | $N/cm^2$ | 700 | 700 | 700 | 80 |
| Evaluation | | | | | |
| Torsional rigidity | — | ⊙ | ○ | ○ | ○ |
| Deflection rigidity | — | ○ | ○ | ○ | ○ |

TABLE 3

| | | Example 5 | Example 6 | Example 7 | Example 8 |
|---|---|---|---|---|---|
| Bottom cover: | | | | | |
| Material | — | Material 1 | Material 1 | Material 1 | Material 1 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.8 | 0.8 |
| Projected area | $cm^2$ | 630 | 630 | 630 | 630 |
| Volume | $cm^3$ | 572 | 572 | 572 | 572 |
| Top cover: | | | | | |
| Material | — | Material 1 | Material 1 | Material 1 | Material 1 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | $cm^2$ | 630 | 630 | 630 | 630 |
| Volume | $cm^3$ | — | — | — | — |
| Reinforcing structure: | | | | | |
| Material | — | Material 2 | Material 2 | Material 2 | Material 2 |
| Length | mm | 206 | 200 | 206 | 200 |
| Width | mm | 296 | 290 | 296 | 290 |
| Height | mm | 8 | 3 | 8 | 8 |
| Angle | ° | 90 | 90 | 90 | 90 |
| Thickness | mm | 0.8 | 0.8 | 0.8 | 0.8 |
| Overlap width | mm | 5 | 5 | 5 | 5 |
| Bonding area | $cm^2$ | 6 | 48 | 49 | 48 |
| Projected area | $cm^2$ | 610 | 580 | 610 | 580 |
| Volume | $cm^3$ | 433 | 126 | 433 | 412 |
| Another reinforcing structure | | | | | |
| Material | — | — | — | — | Material 1 |
| Length | mm | — | — | — | 188 |
| Width | mm | — | — | — | 3 |
| Height | mm | — | — | — | 7.2 |
| Electronic device housing | | | | | |
| Projected area ratio | % | 96.8 | 92.1 | 96.8 | 92.1 |
| Volume ratio | % | 75.7 | 22.0 | 75.7 | 72.0 |
| Integration method | — | Adhesive | Adhesive | Adhesive | Adhesive |

TABLE 3-continued

| | | Example 5 | Example 6 | Example 7 | Example 8 |
|---|---|---|---|---|---|
| Bonding portion | — | Planar joining | Planar joining | Planar joining | Planar joining |
| Peeling load (23° C.) | N/cm$^2$ | 170 | 1500 | 1500 | 1500 |
| Peeling load (200° C.) | N/cm$^2$ | 80 | 700 | 700 | 700 |
| Evaluation | | | | | |
| Torsional rigidity | — | ○ | ○ | ⊙ | ⊙ |
| Deflection rigidity | — | ○ | ○ | ○ | ⊙ |

TABLE 4

| | | Example 9 | Example 10 | Example 11 | Example 12 |
|---|---|---|---|---|---|
| Bottom cover: | | | | | |
| Material | — | Material 1 | Material 1 | Material 1 | Material 1 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.8 | 0.8 |
| Projected area | cm$^2$ | 630 | 630 | 630 | 630 |
| Volume | cm$^3$ | 572 | 572 | 572 | 572 |
| Top cover: | | | | | |
| Material | — | Material 1 | Material 1 | Material 1 | Material 1 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | cm$^2$ | 630 | 630 | 630 | 630 |
| Volume | cm$^3$ | — | — | — | — |
| Reinforcing structure: | | | | | |
| Material | — | Material 2 | Material 2 | Material 2 | Material 2 |
| Length | mm | 200 | 200 | 200 | 200 |
| Width | mm | 290 | 290 | 290 | 290 |
| Height | mm | 8 | 8 | 8 | 8 |
| Angle | ° | 90 | 45 | 90 | 90 |
| Thickness | mm | 0.8 | 0.8 | 0.8 | 0.8 |
| Overlap width | mm | 5 | 5 | 5 | 5 |
| Bonding area | cm$^2$ | 48 | 48 | 48 | 48 |
| Projected area | cm$^2$ | 580 | 580 | 580 | 580 |
| Volume | cm$^3$ | 412 | 412 | 412 | 412 |
| Another reinforcing structure | | | | | |
| Material | — | Material 7 | — | — | — |
| Length | mm | 188 | — | — | — |
| Width | mm | 3 | — | — | — |
| Height | mm | 7.2 | — | — | — |
| Electronic device housing | | | | | |
| Projected area ratio | % | 92.1 | 92.1 | 92.1 | 92.1 |
| Volume ratio | % | 72.0 | 72.0 | 72.0 | 72.0 |
| Integration method | — | Adhesive | Adhesive | Thermal welding | Thermal welding |
| Bonding portion | — | Planar joining | Planar joining | Planar joining | Planar joining |
| Peeling load (23° C.) | N/cm$^2$ | 1500 | 1500 | 2000 | 2500 |
| Peeling load (200° C.) | N/cm$^2$ | 700 | 700 | 50 | 50 |
| Evaluation | | | | | |
| Torsional rigidity | — | ⊙ | ○ | ⊙ | ⊙ |
| Deflection rigidity | — | ⊙ | ○ | ○ | ○ |

TABLE 5

| | | Example 13 | Example 14 | Example 15 | Example 16 |
|---|---|---|---|---|---|
| Bottom cover: | | | | | |
| Material | — | Material 1 | Material 1 | Material 1 | Material 1 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.8 | 0.8 |
| Projected area | $cm^2$ | 630 | 630 | 630 | 630 |
| Volume | $cm^3$ | 572 | 572 | 572 | 572 |
| Top cover: | | | | | |
| Material | — | Material 1 | Material 1 | Material 1 | Material 1 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | $cm^2$ | 630 | 630 | 630 | 630 |
| Volume | $cm^3$ | — | — | — | — |
| Reinforcing structure: | | | | | |
| Material | — | Material 2 | Material 2 | Material 2 | Material 2 |
| Length | mm | 206 | 200 | 200 | 206 |
| Width | mm | 296 | 290 | 290 | 296 |
| Height | mm | 3 | 2 | 3 | 8 |
| Angle | ° | 90 | 90 | 90 | 90 |
| Thickness | mm | 0.8 | 0.8 | 0.8 | 0.8 |
| Overlap width | mm | 5 | 5 | 5 | 5 |
| Bonding area | $cm^2$ | 49 | 48 | 6.0 | 6.0 |
| Projected area | $cm^2$ | 610 | 580 | 580 | 610 |
| Volume | $cm^3$ | 132 | 69 | 126 | 433 |
| Another reinforcing structure | | | | | |
| Material | — | — | — | — | — |
| Length | mm | — | — | — | — |
| Width | mm | — | — | — | — |
| Height | mm | — | — | — | — |
| Electronic device housing | | | | | |
| Projected area ratio | % | 96.8 | 92.1 | 92.1 | 96.8 |
| Volume ratio | % | 23.1 | 12.0 | 22.0 | 75.7 |
| Integration method | — | Thermal welding | Thermal welding | Thermal welding | Thermal welding |
| Bonding portion | — | Planar joining | Planar joining | Planar joining | Planar joining |
| Peeling load (23° C.) | $N/cm^2$ | 2500 | 2500 | 310 | 310 |
| Peeling load (200° C.) | $N/cm^2$ | 50 | 50 | 30 | 30 |
| Evaluation | | | | | |
| Torsional rigidity | — | ○ | ○ | ○ | ⊙ |
| Deflection rigidity | — | ○ | ○ | ○ | ○ |

TABLE 6

| | | Example 17 | Example 18 | Example 19 | Example 20 |
|---|---|---|---|---|---|
| Bottom cover: | | | | | |
| Material | — | Material 1 | Material 1 | Material 1 | Material 1 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.8 | 0.8 |
| Projected area | $cm^2$ | 630 | 630 | 630 | 630 |
| Volume | $cm^3$ | 572 | 572 | 572 | 572 |
| Top cover: | | | | | |
| Material | — | Material 1 | Material 1 | Material 1 | Material 1 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | $cm^2$ | 630 | 630 | 630 | 630 |
| Volume | $cm^3$ | — | — | — | — |

TABLE 6-continued

| | | Example 17 | Example 18 | Example 19 | Example 20 |
|---|---|---|---|---|---|
| Reinforcing structure: | | | | | |
| Material | — | Material 2 | Material 2 | Material 2 | Material 2 |
| Length | mm | 200 | 206 | 200 | 200 |
| Width | mm | 290 | 296 | 290 | 290 |
| Height | mm | 3 | 8 | 8 | 8 |
| Angle | ° | 90 | 90 | 90 | 90 |
| Thickness | mm | 0.8 | 0.8 | 0.8 | 0.8 |
| Overlap width | mm | 5 | 5 | 5 | 5 |
| Bonding area | $cm^2$ | 48 | 49 | 48 | 48 |
| Projected area | $cm^2$ | 580 | 610 | 580 | 580 |
| Volume | $cm^3$ | 126 | 433 | 412 | 412 |
| Another reinforcing structure | | | | | |
| Material | — | — | — | Material 1 | Material 7 |
| Length | mm | — | — | 188 | 188 |
| Width | mm | — | — | 3 | 3 |
| Height | mm | — | — | 7.2 | 7.2 |
| Electronic device housing | | | | | |
| Projected area ratio | % | 92.1 | 96.8 | 92.1 | 92.1 |
| Volume ratio | % | 22.0 | 75.7 | 72.0 | 72.0 |
| Integration method | — | Thermal welding | Thermal welding | Thermal welding | Thermal welding |
| Bonding portion | — | Planar joining | Planar joining | Planar joining | Planar joining |
| Peeling load (23° C.) | $N/cm^2$ | 2500 | 2500 | 2500 | 2500 |
| Peeling load (200° C.) | $N/cm^2$ | 50 | 50 | 50 | 50 |
| Evaluation | | | | | |
| Torsional rigidity | — | ○ | ⊙ | ⊙ | ⊙ |
| Deflection rigidity | — | ○ | ○ | ⊙ | ⊙ |

TABLE 7

| | | Example 21 | Example 22 | Example 23 | Example 24 |
|---|---|---|---|---|---|
| Bottom cover: | | | | | |
| Material | — | Material 1 | Material 3 | Material 4 | Material 5 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.6 | 0.8 | 0.2 |
| Projected area | $cm^2$ | 630 | 630 | 630 | 630 |
| Volume | $cm^3$ | 572 | 586 | 572 | 615 |
| Top cover: | | | | | |
| Material | — | Material 1 | Material 1 | Material 1 | Material 1 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | $cm^2$ | 630 | 630 | 630 | 630 |
| Volume | $cm^3$ | — | — | — | — |
| Reinforcing structure: | | | | | |
| Material | — | Material 2 | Material 2 | Material 2 | Material 2 |
| Length | mm | 200 | 200 | 200 | 200 |
| Width | mm | 290 | 290 | 290 | 290 |
| Height | mm | 8 | 8 | 8 | 8 |
| Angle | ° | 45 | 90 | 90 | 90 |
| Thickness | mm | 0.8 | 0.8 | 0.8 | 0.8 |
| Overlap width | mm | 5 | 5 | 5 | 5 |
| Bonding area | $cm^2$ | 48 | 48 | 48 | 48 |
| Projected area | $cm^2$ | 580 | 580 | 580 | 580 |
| Volume | $cm^3$ | 412 | 412 | 412 | 412 |
| Another reinforcing structure | | | | | |
| Material | — | — | — | — | — |
| Length | mm | — | — | — | — |

TABLE 7-continued

| | | Example 21 | Example 22 | Example 23 | Example 24 |
|---|---|---|---|---|---|
| Width | mm | — | — | — | — |
| Height | mm | — | — | — | — |
| Electronic device housing | | | | | |
| Projected area ratio | % | 92.1 | 92.1 | 92.1 | 92.1 |
| Volume ratio | % | 72.0 | 70.2 | 72.0 | 66.9 |
| Integration method | — | Thermal welding | Adhesive | Adhesive | Adhesive |
| Bonding portion | — | Planar joining | Planar joining | Planar joining | Planar joining |
| Peeling load (23° C.) | N/cm$^2$ | 2500 | 1500 | 1500 | 1500 |
| Peeling load (200° C.) | N/cm$^2$ | 50 | 700 | 700 | 700 |
| Evaluation | | | | | |
| Torsional rigidity | — | ○ | ⊙ | ○ | ○ |
| Deflection rigidity | — | ○ | ○ | ○ | ○ |

TABLE 8

| | | Example 25 | Example 26 | Example 27 | Example 28 |
|---|---|---|---|---|---|
| Bottom cover: | | | | | |
| Material | — | Material 2 | Material 1 | Material 1 | Material 1 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.4 | 0.8 |
| Projected area | cm$^2$ | 630 | 630 | 630 | 630 |
| Volume | cm$^3$ | 572 | 572 | 601 | 572 |
| Top cover: | | | | | |
| Material | — | Material 1 | Material 1 | Material 1 | Material 1 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.6 | 0.8 |
| Projected area | cm$^2$ | 630 | 630 | 630 | 630 |
| Volume | cm$^3$ | — | — | — | — |
| Reinforcing structure: | | | | | |
| Material | — | Material 2 | Material 1 | Material 2 | Material 2 |
| Length | mm | 200 | 200 | 200 | 200 |
| Width | mm | 290 | 290 | 290 | 290 |
| Height | mm | 8 | 8 | 8 | 8 |
| Angle | ° | 90 | 90 | 90 | 90 |
| Thickness | mm | 0.8 | 0.8 | 0.8 | 0.4 |
| Overlap width | mm | 5 | 5 | 5 | 5 |
| Bonding area | cm$^2$ | 48 | 48 | 48 | 48 |
| Projected area | cm$^2$ | 580 | 580 | 580 | 580 |
| Volume | cm$^3$ | 412 | 412 | 412 | 438 |
| Another reinforcing structure | | | | | |
| Material | — | — | — | — | — |
| Length | mm | — | — | — | — |
| Width | mm | — | — | — | — |
| Height | mm | — | — | — | — |
| Electronic device housing | | | | | |
| Projected area ratio | % | 92.1 | 92.1 | 92.1 | 92.1 |
| Volume ratio | % | 72.0 | 72.0 | 68.6 | 76.5 |
| Integration method | — | Adhesive | Adhesive | Adhesive | Adhesive |
| Bonding portion | — | Planar joining | Planar joining | Planar joining | Planar joining |
| Peeling load (23° C.) | N/cm$^2$ | 1500 | 1500 | 1500 | 1500 |
| Peeling load (200° C.) | N/cm$^2$ | 700 | 700 | 700 | 700 |

TABLE 8-continued

| | | Example 25 | Example 26 | Example 27 | Example 28 |
|---|---|---|---|---|---|
| Evaluation | | | | | |
| Torsional rigidity | — | ⊙ | ⊙ | ○ | ⊙ |
| Deflection rigidity | — | ○ | ○ | ○ | ○ |

TABLE 9

| | | Example 29 | Example 30 | Reference Example 1 |
|---|---|---|---|---|
| Bottom cover: | | | | |
| Material | — | Material 3 | Material 6 | Material 1 |
| Length | mm | 210 | 210 | 180 |
| Width | mm | 300 | 300 | 230 |
| Height | mm | 10 | 10 | 7 |
| Thickness | mm | 0.6 | 0.8 | 0.8 |
| Projected area | $cm^2$ | 630 | 630 | 414 |
| Volume | $cm^3$ | 586 | 572 | 253 |
| Top cover: | | | | |
| Material | — | Material 1 | Material 6 | Display |
| Length | mm | 210 | 210 | 210 |
| Width | mm | 300 | 300 | 300 |
| Height | mm | — | — | — |
| Thickness | mm | 0.8 | 0.8 | 0.8 |
| Projected area | $cm^2$ | 630 | 630 | 630 |
| Volume | $cm^3$ | — | — | — |
| Reinforcing structure: | | | | |
| Material | — | Material 2 | Material 6 | Material 2 |
| Length | mm | 200 | 200 | 162 |
| Width | mm | 290 | 290 | 215 |
| Height | mm | 8 | 8 | 5 |
| Angle | ° | 90 | 90 | 90 |
| Thickness | mm | 0.8 | 0.8 | 0.5 |
| Overlap width | mm | 5 | 5 | 5 |

TABLE 9-continued

| | | Example 29 | Example 30 | Reference Example 1 |
|---|---|---|---|---|
| Bonding area | $cm^2$ | 48 | 48 | 37 |
| Projected area | $cm^2$ | 580 | 580 | 348.3 |
| Volume | $cm^3$ | 412 | 412 | 155 |
| Another reinforcing structure | | | | |
| Material | — | — | — | — |
| Length | mm | — | — | — |
| Width | mm | — | — | — |
| Height | mm | — | — | — |
| Electronic device housing | | | | |
| Projected area ratio | % | 92.1 | 92.1 | 84.1 |
| Volume ratio | % | 70.2 | 72.0 | 61.4 |
| Integration method | — | Thermal welding | Thermal welding | Thermal welding |
| Bonding portion | — | Planar joining | Planar joining | Planar joining |
| Peeling load (23° C.) | $N/cm^2$ | 2500 | 2000 | 2500 |
| Peeling load (200° C.) | $N/cm^2$ | 50 | 50 | 50 |
| Evaluation | | | | |
| Torsional rigidity | — | ⊙ | ○ | ⊙ |
| Deflection rigidity | — | ○ | Δ | ○ |

TABLE 10

| | | Comparative Example 1 | Comparative Example 2 | Comparative Example 3 | Comparative Example 4 |
|---|---|---|---|---|---|
| Bottom cover: | | | | | |
| Material | — | Material 1 | Material 1/ Material 2 | Material 1 | Material 1 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 1.6 | 0.8 | 0.8 |
| Projected area | $cm^2$ | 630 | 630 | 630 | 630 |
| Volume | $cm^3$ | 572 | 516 | 572 | 572 |
| Top cover: | | | | | |
| Material | — | Material 1 | Material 1 | Material 1 | Material 1 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | $cm^2$ | 630 | 630 | 630 | 630 |
| Volume | $cm^3$ | — | — | — | — |
| Reinforcing structure: | | | | | |
| Material | — | — | — | Material 2 | Material 2 |
| Length | mm | — | — | 100 | 100 |
| Width | mm | — | — | 200 | 200 |
| Height | mm | — | — | 2 | 8 |
| Angle | ° | — | — | 90 | 90 |
| Thickness | mm | — | — | 1 | 1 |
| Overlap width | mm | — | — | 5 | 1 |
| Bonding area | $cm^2$ | — | — | 29 | 6 |
| Projected area | $cm^2$ | — | — | 200 | 200 |
| Volume | $cm^3$ | — | — | 19 | 136 |

TABLE 10-continued

| | | Comparative Example 1 | Comparative Example 2 | Comparative Example 3 | Comparative Example 4 |
|---|---|---|---|---|---|
| Another reinforcing structure | | | | | |
| Material | — | — | — | — | — |
| Length | mm | — | — | — | — |
| Width | mm | — | — | — | — |
| Height | mm | — | — | — | — |
| Electronic device housing | | | | | |
| Projected area ratio | % | 0.0 | 0.0 | 31.7 | 31.7 |
| Volume ratio | % | 0.0 | 0.0 | 3.4 | 23.7 |
| Integration method | — | — | — | Adhesive | Adhesive |
| Bonding portion | — | — | — | Planar joining | Planar joining |
| Peeling load (23° C.) | $N/cm^2$ | — | — | 1500 | 1500 |
| Peeling load (200° C.) | $N/cm^2$ | — | — | 700 | 700 |
| Evaluation | | | | | |
| Torsional rigidity | — | X | X | X | X |
| Deflection rigidity | — | X | ○ | X | X |

INDUSTRIAL APPLICABILITY

According to the present invention, there can be provided a housing, particularly an electronic device housing in which an electronic device component is built, the housing having improved torsional rigidity while having a reduced thickness and weight.

DESCRIPTION OF REFERENCE SIGNS

1: Housing
2: Bottom cover
3: Reinforcing structure
4: Top cover
5: Another reinforcing structure
21: Flat portion
22: Rising wall member
31: Flat portion
32: Rising wall member
33: Joining portion

The invention claimed is:

1. A housing comprising: a bottom cover; a top cover; and a reinforcing structure that is disposed in a space divided by the bottom cover and the top cover and has a flat portion, a rising wall member erected on a rim of the flat portion, and a joining portion extending from a rim of the rising wall member, or a curved portion, and a joining portion extending from a rim of the curved portion, the joining portion of the reinforcing structure being joined to the bottom cover or the top cover, wherein the area of the joining portion is within a range of 10 $cm^2$ or more and 100 $cm^2$ or less, and the maximum value of the height of the reinforcing structure is within a range of 3 mm or more and 30 mm or less, and wherein the flat portion of the reinforcing structure is arranged apart from the bottom cover and the top cover.

2. The housing according to claim 1, wherein the projected area of the reinforcing structure in a direction of the bottom cover or the top cover to which the joining portion is joined is within a range of 60% or more and 95% or less of the area of the bottom cover or the top cover to which the joining portion is joined.

3. The housing according to claim 1, wherein the volume of a hollow structure formed by joining the joining portion to the bottom cover or the top cover is within a range of 55% or more and 95% or less of the volume of the space.

4. The housing according to claim 1, wherein the reinforcing structure is bonded to the bottom cover or the top cover by thermal welding.

5. The housing according to claim 1, wherein the reinforcing structure is joined to the bottom cover or the top cover in such a manner that the peeling load at 23° C. is within a range of 60 $N/cm^2$ or more and 5000 $N/cm^2$ or less, and the peeling load at 200° C. is within a range of less than 60 $N/cm^2$.

6. The housing according to claim 1, wherein the reinforcing structure, and the bottom cover or the top cover to which the reinforcing structure is joined are formed of a fiber-reinforced composite material, a thermoplastic resin is provided in or on a joining portion of at least one of the reinforcing structure and the top cover or the bottom cover to which the reinforcing structure is joined, and the reinforcing structure and the bottom cover or the top cover are joined with the thermoplastic resin.

7. The housing according to claim 1, comprising a heat generation member disposed on a surface of the reinforcing structure in the hollow structure formed by joining the reinforcing structure and the bottom cover or the top cover.

8. The housing according to claim 1, comprising another reinforcing structure in the hollow structure formed by joining the reinforcing structure and the bottom cover or the top cover.

9. The housing according to claim 8, wherein an electronic component is disposed in a space other than the hollow structure.

10. The housing according to claim 1, wherein no other reinforcing structure is arranged between the reinforcing structure and the bottom cover or the top cover to which the joining portion is not joined.

11. A housing comprising: a bottom cover; a top cover; and a reinforcing structure that is disposed in a space divided by the bottom cover and the top cover and has an opening, the reinforcing structure having a rim, the rim being joined to the bottom cover or the top cover, wherein the projected area of the reinforcing structure in a direction of the bottom cover or the top cover to which the rim of the reinforcing structure is joined is within a range of 60% or more and 95% or less of the area of the bottom cover or the top cover to which the rim of the reinforcing structure is joined, and wherein the flat portion of the reinforcing structure is arranged apart from the bottom cover and the top cover.

12. The housing according to claim 11, wherein the volume of a hollow structure formed by joining the rim to the bottom cover or the top cover is within a range of 55% or more and 95% or less of the volume of the space.

13. The housing according to claim 11, wherein the reinforcing structure is bonded to the bottom cover or the top cover by thermal welding.

14. The housing according to claim 11, wherein the reinforcing structure is joined to the bottom cover or the top cover in such a manner that the peeling load at 23° C. is within a range of 60 $N/cm^2$ or more and 5000 $N/cm^2$ or less, and the peeling load at 200° C. is within a range of less than 60 $N/cm^2$.

15. The housing according to claim 11, wherein the reinforcing structure, and the bottom cover or the top cover to which the reinforcing structure is joined are formed of a fiber-reinforced composite material, a thermoplastic resin is provided in or on a joining portion of at least one of the reinforcing structure and the top cover or the bottom cover to which the reinforcing structure is joined, and the reinforcing structure and the bottom cover or the top cover are joined with the thermoplastic resin.

16. The housing according to claim 11, comprising a heat generation member disposed on a surface of the reinforcing structure in the hollow structure formed by joining the reinforcing structure and the bottom cover or the top cover.

17. The housing according to claim 11, comprising another reinforcing structure in the hollow structure formed by joining the reinforcing structure and the bottom cover or the top cover.

18. The housing according to claim 17, wherein an electronic component is disposed in a space other than the hollow structure.

19. The housing according to claim 11, wherein no other reinforcing structure is arranged between the reinforcing structure and the bottom cover or the top cover to which the joining portion is not joined.

20. A housing comprising: a bottom cover; a top cover; and a reinforcing structure that is disposed in a space divided by the bottom cover and the top cover and has an opening, the reinforcing structure having a rim, the rim being joined to the bottom cover or the top cover, wherein the volume of a hollow structure formed by joining the rim of the reinforcing structure to the bottom cover or the top cover is within a range of 55% or more and 95% or less of the volume of the space, in the above-described invention, and wherein the flat portion of the reinforcing structure is arranged apart from the bottom cover and the top cover.

21. The housing according to claim 20, wherein the reinforcing structure is bonded to the bottom cover or the top cover by thermal welding.

22. The housing according to claim 20, wherein the reinforcing structure is joined to the bottom cover or the top cover in such a manner that the peeling load at 23° C. is within a range of 60 $N/cm^2$ or more and 5000 $N/cm^2$ or less, and the peeling load at 200° C. is within a range of less than 60 $N/cm^2$.

23. The housing according to claim 20, wherein the reinforcing structure, and the bottom cover or the top cover to which the reinforcing structure is joined are formed of a fiber-reinforced composite material, a thermoplastic resin is provided in or on a joining portion of at least one of the reinforcing structure and the top cover or the bottom cover to which the reinforcing structure is joined, and the reinforcing structure and the bottom cover or the top cover are joined with the thermoplastic resin.

24. The housing according to claim 20, comprising a heat generation member disposed on a surface of the reinforcing structure in the hollow structure formed by joining the reinforcing structure and the bottom cover or the top cover.

25. The housing according to claim 20, comprising another reinforcing structure in the hollow structure formed by joining the reinforcing structure and the bottom cover or the top cover.

26. The housing according to claim 25, wherein an electronic component is disposed in a space other than the hollow structure.

27. The housing according to claim 20, wherein no other reinforcing structure is arranged between the reinforcing structure and the bottom cover or the top cover to which the joining portion is not joined.

* * * * *